(12) United States Patent
Schultz et al.

(10) Patent No.: US 10,620,429 B2
(45) Date of Patent: Apr. 14, 2020

(54) ELECTROWETTING WITH COMPENSATION FOR FORCE THAT MAY OTHERWISE CAUSE DISTORTION OR ABERRATION

(71) Applicant: ABL IP HOLDING LLC, Conyers, GA (US)

(72) Inventors: Alexander Jacob Schultz, Sterling, VA (US); John M. Reilly, Leesburg, VA (US); James Michael Phipps, Fairfax, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 142 days.

(21) Appl. No.: 15/691,069

(22) Filed: Aug. 30, 2017

(65) Prior Publication Data

US 2019/0064503 A1 Feb. 28, 2019

(51) Int. Cl.
*G02B 26/00* (2006.01)

(52) U.S. Cl.
CPC .................. *G02B 26/005* (2013.01)

(58) Field of Classification Search
CPC .. G02B 26/005; G02B 19/00; G02B 19/0009; G02B 19/0014; G02B 19/0028; G02B 19/0038; G02B 19/0042; G02B 19/009; G02B 26/004; G02B 26/0875
USPC .......................... 359/290–292, 295, 296, 298
See application file for complete search history.

(56) References Cited

U.S. PATENT DOCUMENTS

| | | | |
|---|---|---|---|
| 2009/0045814 A1* | 2/2009 | Csutak | G01V 8/02 324/333 |
| 2012/0105955 A1* | 5/2012 | Takai | G02B 3/0075 359/463 |
| 2014/0253536 A1* | 9/2014 | Honda | G06F 3/044 345/213 |
| 2016/0054483 A1 | 2/2016 | Feng et al. | |

OTHER PUBLICATIONS

U.S. Appl. No. 15/661,742, filed Aug. 3, 2017, entitled "Sealing and Lateral Pressure Compensation Structures Usable With Fluidic or Gaseous Material Containers," (71 pages).
U.S. Appl. No. 15/479,857, filed Apr. 5, 2017, entitled "Electrowetting Assembly Technique and Cell Structure," (69 pages).
U.S. Appl. No. 15/674,040, filed Aug. 10, 2017, entitled "Electrowetting Cell Constructs," (52 pages).
U.S. Appl. No. 15/228,414, filed Aug. 4, 2016, entitled "Configurable Optical Transducers Using an Optical Modulator and One or More Lenses," (49 pages).

* cited by examiner

*Primary Examiner* — Brandi N Thomas
(74) *Attorney, Agent, or Firm* — RatnerPrestia

(57) ABSTRACT

In an electrowetting cell or system using the cell, electrode configuration and/or associated control of electrode drive signal(s) compensate for the impact of an external condition such as gravity, vibration or motion, which may otherwise cause distortion or aberration in the optical geometry of the fluid(s) of the electrowetting cell. The compensation technology may allow for larger electrowetting cell designs, whether lenses, prisms or other various electrowetting devices.

14 Claims, 11 Drawing Sheets

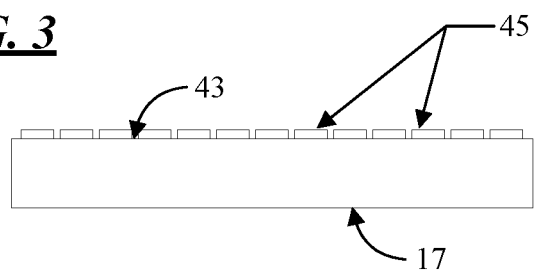
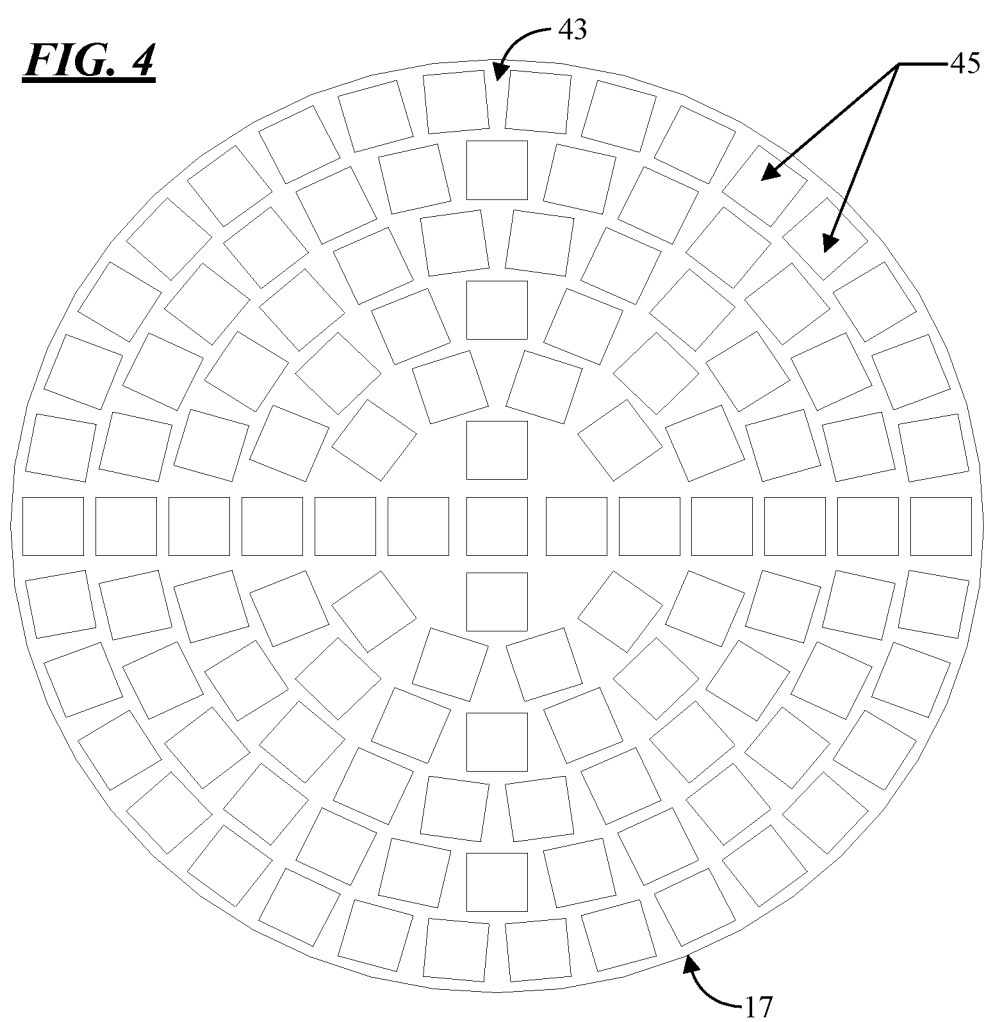

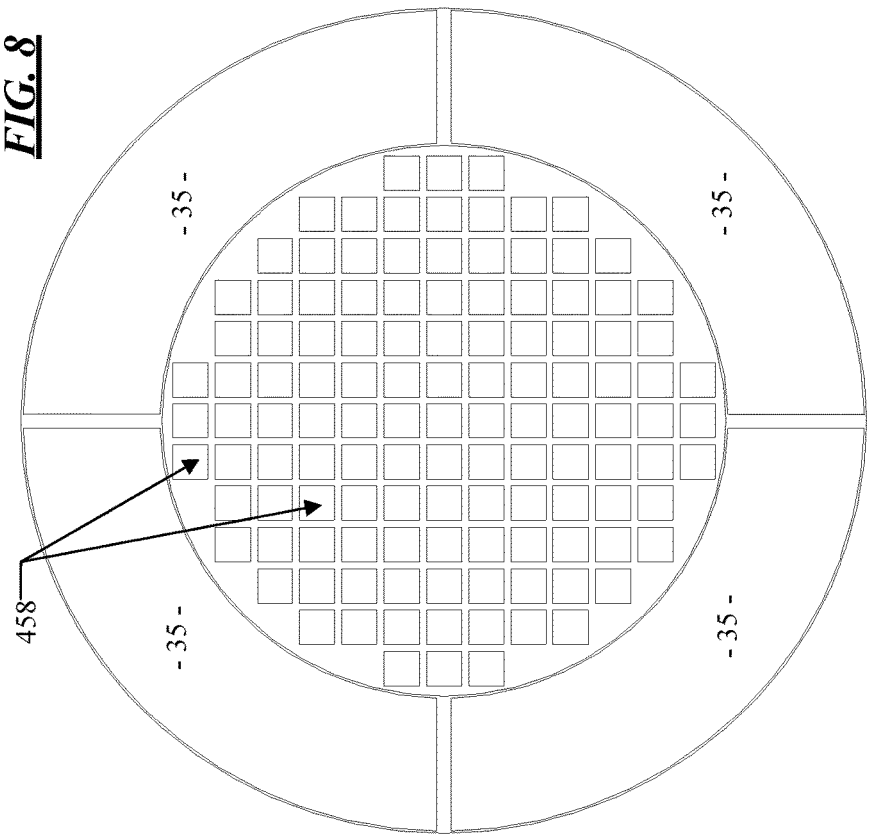
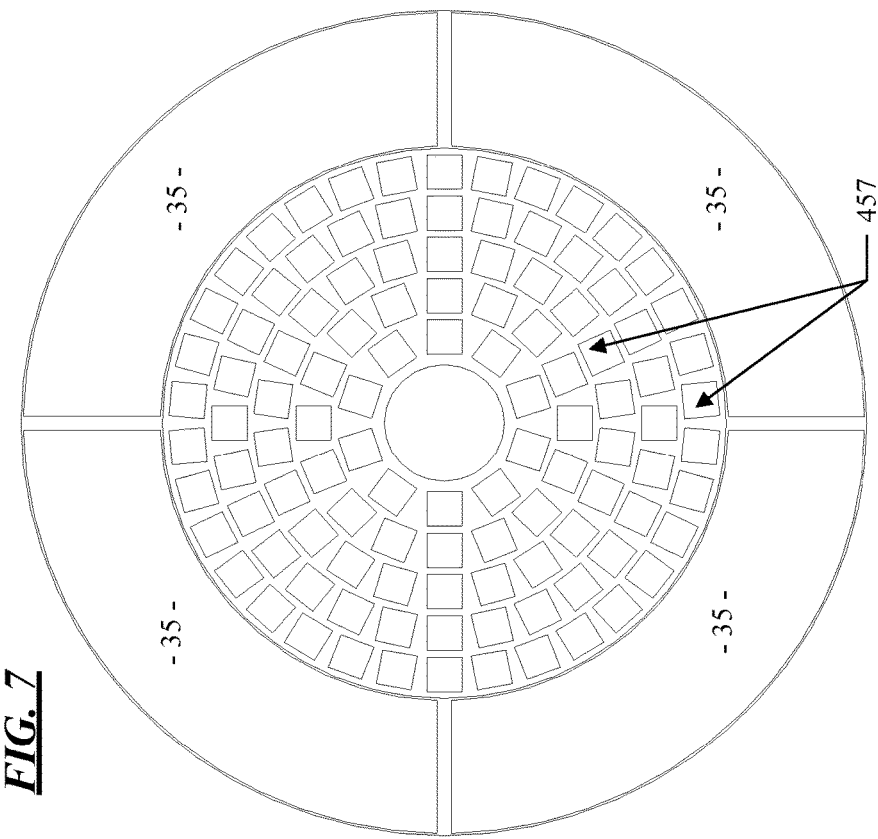

ELECTROWETTING WITH COMPENSATION FOR FORCE THAT MAY OTHERWISE CAUSE DISTORTION OR ABERRATION

TECHNICAL FIELD

The present subject matter relates to techniques and equipment to compensate for the effects of a force such as gravity and/or due to orientation on the optical geometry of fluid(s) in an electrowetting cell.

BACKGROUND

Electrowetting is a microfluidic phenomenon that modifies the shape of a liquid in relation to a surface by applying an electrical field, e.g. by applying a voltage across two electrodes. For example, if the surface is hydrophobic, the electrical field causes a change in the shape of the liquid that appears to change the wetting properties of the hydrophobic surface. If the fluid(s) in an electrowetting cell and some of the wall(s) around the fluid(s) are sufficiently transparent with respect to a light wavelength range of interest, the electrowetting cell may be used as an electrically controllable optic. Such optics have recently been the subject of a widening scope of light processing applications, such as variable lenses, variable prisms, optical switches, displays, etc.

Electrowetting lenses, for example, are conventionally used in the camera industry. These lenses tend to be very small (e.g. millimeter scale) and operate in a small tunable range (small range of input or output light angle). The thickness of the fluidic lenses are also typically less than half the cell size. Such small effective lens sizes tends to limit the functionality of any given structural design of the electrowetting optic. An electrowetting cell structure for a lens for a camera application or the like, e.g. to selectively focus light input to an image sensor or to selectively control beam distribution of a flash, typically supports only beam shaping.

There have been proposals to develop variable optical prisms using electrowetting cell arrangements. An electrowetting lens may have various different shaped structures, e.g. round, square or rectangular. An electrowetting prism normally is square or rectangular. The overall working principle for either beam shaping or steering is the same—the voltage applied across the dielectric layer attracts or repels the conducting liquid so as to change the wetting area of the cell and thus the shape of the liquid(s) in the cell.

Typically, individual electrowetting cells have been small, for example several millimeters across (the diameter or diagonal of) the active optical area of the cells. Adaptations of such cells for larger scale light processing applications requires combining a number of such small cells into a larger area array or matrix, which increases manufacturing complexity and cost and may increase the complexity of the circuitry needed to drive the array of cells. As size of the cell increases, one of the negative effects relates to the impact of external forces, such as gravity, on the shape of the meniscus between the two fluids and thus the shape of the optical lens or prism provided by the cell. The impact of an external force also is directional, in that the resulting distortion of the meniscus depends on the orientation of the cell relative to the direction of the applied force.

SUMMARY

The concepts described in the detailed description below and shown in the drawings improve over prior electrowetting cell designs and/or over prior controls for such cells by compensating for gravity or the like and/or for different effects of such external forces on the fluids within an electrowetting cell caused by differences in orientation of cell.

An electrowetting cell, for example, includes a fluid sealed capsule having an optical axis. The capsule has a lateral enclosure surrounding the optical axis with one or more lateral walls and at least one control channel electrode at the lateral wall(s). The capsule also has a common electrode. A first transparent wall coupled to the first axial end of the lateral enclosure seals that end of the enclosure. A second transparent wall coupled to the second axial end of the lateral enclosure, opposite the first transparent wall, seals the second axial end of the enclosure. At least one external-force compensation electrode is located at the second transparent wall. A first fluid inside the capsule, located at the sealed second axial end of the lateral enclosure in proximity to the second transparent wall, is relatively non-conductive. A second fluid fills the remainder of the capsule to the first transparent wall. The second fluid is relatively conductive and in contact with the common electrode. In an example of this type of cell, first and second fluids may be immiscible with respect to each other.

The examples also encompass a system that includes an electrowetting cell, control channel and compensation drivers, and a processor. The electrowetting cell includes a substrate having a lateral enclosure surrounding the optical axis with one or more lateral walls. At least one control channel electrode is located at the lateral wall(s). The electrowetting cell also includes a common electrode. A first transparent plate is coupled to the substrate to seal the first axial end of the enclosure. A second transparent plate is coupled to the substrate at the second axial end of the enclosure, opposite the first transparent plate, to seal the second axial end of the enclosure. The electrowetting cell further includes at least one external-force compensation electrode formed in or on a surface of the second transparent plate. A first fluid inside the electrowetting cell is located at the sealed second axial end of the lateral enclosure, in proximity to the at least one external-force compensation electrode. A second fluid fills the remainder of the electrowetting cell to an interior wall of the first transparent plate. In this example the first fluid is relatively non-conductive, the second fluid is relatively conductive and in contact with the common electrode. The first and second fluids are immiscible with respect to each other. In the example system, at least one control channel driver is coupled to the at least one control channel electrode to apply control voltage. The system also has at least one compensation driver coupled to the external-force compensation electrode. This driver is configured to apply a compensation voltage to the external-force compensation electrode. The processor is coupled to the drivers. The processor controls the at least one control channel driver to apply voltage to each control channel electrode to establish a selected optical state of the fluids in the electrowetting cell. The processor also sets the compensation voltage applied to external-force compensation electrode, to compensate for a distortion of the actual state of the fluids in the electrowetting cell due to an external force on the fluids.

The compensation may be based on a sensed condition of the fluid system of the cell. For example, a circuit may monitor an electric condition of one of the fluids related to an actual state of the meniscus between the two fluids, e.g. as an indication of degree of distortion caused by the force. In some examples, the compensation also may be based on sensed orientation of the electrowetting cell, e.g. relative to the force causing the sensed distortion(s).

Another system example includes an electrowetting cell having two fluids sealed in a container. The container includes end walls at opposite axial ends of the container and a lateral wall extending at least partially between the end walls. A control channel electrode is located on the lateral wall. In this example, at least one of the end walls of the container is transparent. The electrowetting cell further includes an external-force compensation electrode at one of the end walls of the container. A compensation driver is coupled to apply a compensation voltage to the external-force compensation electrode. This system example also includes means for sensing a condition of the cell indicative of an external force capable of causing distortion of a meniscus between the two fluids. A processor, coupled to the means for sensing, is configured to control the compensation driver to apply the compensation voltage in a manner based on the sensed condition.

A cell or system like those outlined above may be combined with an optical/electrical transducer, for various applications involving controllable light processing through the controllable electrowetting cell. For example, for a large format lighting application (e.g. a luminaire or vehicle lamp), the transducer would be one or more light sources, suitable for the particular lighting application. For example, for a light detection application, the transducer may be one or more suitable light sensors.

The concepts illustrated in the drawing and described in detail below also encompass methods of operating electrowetting cells. An example of such a method may entail applying a control voltage to each of one or more control channel electrodes of an electrowetting cell located about an optical axis of the electrowetting cell to establish an optical state of a meniscus between two different fluids in the electrowetting cell, one fluid being relatively conductive and the other being relatively non-conductive. An electric condition of one or more of the fluids of the electrowetting cell are sensed. The method example also involves applying a compensation voltage to an external-force compensation electrode, which is located adjacent the relatively non-conductive one of the fluids and perpendicular to the optical axis of the electrowetting cell. The applied compensation voltage is based on the sensed electric condition and serves to compensate for a distortion of the actual state of the meniscus between the two fluids of the electrowetting cell due to an external force on the fluids.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

FIG. 3 is a side view of the plate with the external-force compensation electrodes, in the cell of FIGS. 1 and 2.

FIG. 4 is a top view of the plate with the external-force compensation electrodes, providing an enlarged view of the first example layout of the compensation electrodes as in FIG. 2.

FIGS. 7 and 8 show the four control channel electrodes and two different layouts of the external-force compensation electrodes, either of which may be implemented in an electrowetting cell otherwise similar to the that of FIG. 1.

DETAILED DESCRIPTION

Figure 1:
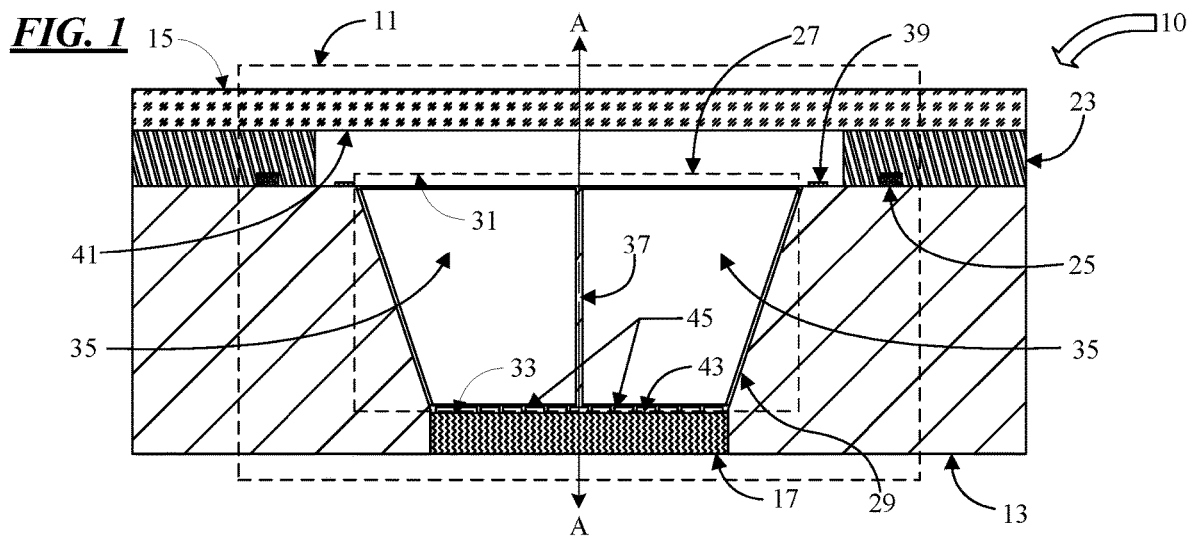
FIG. 1 is a cross sectional view of an example of an electrowetting cell that includes a number of external-force compensation electrodes.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The overall size of individual electrowetting cells has generally been limited due to geometrical constraints imparted by gravity and/or other external forces. It would be advantageous, particularly for larger format applications (examples in lighting include luminaires for general lighting, lamps for vehicle lighting, etc.), to compensate for gravity or the like and/or for different effects of such external forces on the variable meniscus of an electrowetting cell caused by differences in orientation of cell.

The examples discussed in more detail below address issues of distortion due to external force on an electrowetting cell. The examples encompass inclusion in the cell of one or more force compensation electrodes, for example, across the optical axis of the electrowetting cell at one end of the well or capsule of the cell that contains the fluids. The compensation electrode(s) is/are in addition to the control channel electrode(s) of the cell that normally control the shape of the fluid system within the cell.

In an example that utilizes such a cell, an electric condition relative to the cell fluids may be sensed, and control of the compensation voltage applied to a compensation electrode may be based on the sensed condition. In some examples, compensation voltage applied to an external-force compensation electrode also may be based on sensed orientation of the electrowetting cell, e.g. to select reference values for comparison to the sensed condition(s) and/or to otherwise adjust compensation voltage(s) derived from sensing of the condition.

As outlined earlier, electrowetting is a microfluidic phenomenon that enables changing of the configuration of a contained fluid system in response to the electric field produced by an applied voltage. In general, application of the electric field seemingly modifies the wetting properties of a surface (e.g. the ability of fluid to maintain physical contact with a hydrophobic surface) in the fluid system. Assuming a two fluid system, where one fluid is relatively conductive, and the other is relatively non-conductive; when a fluid is in contact with a surface and that surface becomes charged, the electric field tends to pull the mass of the electrically conductive fluid towards the surface. As the conductive fluid changes shape due to this force, the non-conductive fluid also changes shape. On a micro scale, the contact angle is unaffected. On a macro scale it seems that the wetting properties have changed. This phenomenon enables controlled changes to the overall distribution and shape of the fluids with respect to the surface, in response to changes of the voltage(s) applied to change the electric field. The change in shapes of the fluids also changes the shape of the meniscus formed at the interface of the two fluids.

Examples of electrowetting optics described in detail herein and shown in several of the drawings use two immiscible fluids having different electrical properties. In at least some examples, the two fluids have different indices of refraction. One fluid may be relatively conductive. The other fluid, typically the fluid adjacent to a hydrophobic surface, may be relatively non-conductive. The conductive fluid typically is a transparent fluid, whereas the other fluid may be substantially transparent or may have other optical properties (e.g. reflectivity). Where both fluids are transparent or transmissive, the non-conductive fluid may exhibit a higher index of refraction than the conductive fluid. However, this is not necessary. In some examples, the non-conductive fluid may exhibit a lower index of refraction than the conductive fluid.

In a transmissive electrowetting optic example using two fluids, changing the applied electric field changes the shape of the fluid interface surface or "meniscus" between the two fluids and thus the refraction of the light passing through the meniscus, for example, so that the electrowetting optic operates as a variable shape lens and/or a variable shape prism. Depending on the application for the electrowetting optic, the light may enter the fluid system to pass first through either one or the other of the two fluids.

The electrowetting cell includes one or more control channel electrodes. A voltage is applied to each control channel electrode, so as to establish a selected optical state of the fluids in the electrowetting cell and thus the shape of the meniscus. In the examples described below and shown in the drawings, the electrowetting cell also includes at least one external-force compensation electrode, for example, on a transparent wall that extends across the optical axis of the cell. A control voltage applied to the external-force compensation electrode can be set to compensate for a distortion of the actual state of the fluids in the electrowetting cell due to an external force on the fluids. The voltage applied to the external-force compensation electrode, for example, can be set and/or adjusted over time based on a sensed condition of the fluid system of the cell and/or detected orientation of the cell.

Reference now is made in detail to the examples illustrated in the accompanying drawings and discussed below. The drawings and detailed description herein will include examples of the electrowetting cell structure and variations of the compensation electrodes, examples of systems that include such a cell and associated driver and control circuitry, as well as examples of control algorithms for compensation for force and/or orientation of the cell. Turning first to an example of cell structure, FIGS. 1 to 6 illustrate aspects of an example of an electrowetting cell 10.

Directional terms such as lateral, longitudinal, up, down, top, bottom and side are used by way of example only with reference to the illustrated orientation of the cell, e.g. as shown in FIG. 1 and other drawings, and are not limiting as to direction or orientation of any component of or cell constructed as otherwise described herein. The illustrated example represents a cell configured for a transmissive application in which light passes entirely through the cell, although the compensation techniques described herein may be suitable to electrowetting cells configured for a reflective application or other type of applicative. The example 10 of the electrowetting cell includes a fluid sealed container or capsule 11 having an optical axis (represented by the central two-ended arrow in FIG. 1). The capsule 11 may be constructed in a variety of different ways and/or so as to have a variety of different shapes/configurations.

In the example of FIGS. 1 and 26, the electrowetting cell 10 includes a substrate 13, a first transparent plate 15 and a second transparent plate 17 (see FIGS. 1, 3 and 4). As shown in FIG. 1, capsule 11 for containing fluids 19 and 21 (FIGS. 5 and 6) is formed by portions of the substrate 13, the transparent plates 15 and 17, as well as a spacer 23 and an O-ring type seal 25, in this example.

The capsule 11 has a lateral enclosure 27 surrounding the optical axis with one or more lateral walls 29. The illustrations represent an example in which the lateral enclosure 27 is circular, when viewed looking into the cell 10 along the optical axis (see e.g. FIG. 2). The circular configuration, however, is a non-limiting example. The enclosure 27 of the capsule 11 containing the fluids 19, 21 may have other shapes, for example, the shape of an oval, or the shape of a polygon such as a triangle, a square or other rectangle, a hexagon, an octagon, etc. As noted, the lateral enclosure 27 has one or more lateral walls 29. In the circular example, there may be one continuous wall surface around the optical axis. In cells with other enclosure shapes, there may be more distinct walls, e.g. three if the enclosure is triangular, four if the enclosure is square or otherwise rectangular, etc.

The longitudinal contour of the enclosure also may take a variety of shapes. In the illustrated circular example of the enclosure 27, the wall 29 tapers (analogous to a truncated cone) from a first axial end 31 to a second axial end 33. The enclosure could be cylindrical, could expand outward as it transitions from the first end 31 to the second end 33, or could have a variable angle or longitudinally curved contour extending from one end to the other. Other longitudinal contours may be used for polygonal shaped enclosure walls.

As noted, part of the substrate 13 forms the lateral enclosure 27, including the lateral wall(s) 29. The electrowetting cell 10 also has at least one control channel electrode 35 at the one or more lateral walls 29. There may be as few one, two or three control channel electrodes 35. To provide a significant degree of control of the shape of the meniscus between the two fluids, the example cell 10 has four control channel electrodes 35 on different areas of the lateral wall 29, electrically separated from each other by gaps 37. Still larger numbers of control channel electrodes may be used to provide control suited to particular applications of the electrowetting cell 10. The size, geometry, and quantity of the control channel electrodes 35 for a particular structural design of a cell may be based on cell application requirements and technical/manufacturing limitations.

Although other configurations may be used, the example shows control channel electrodes 35 that extend longitudinally from approximately the first end of the lateral enclosure 27 (e.g. from the first end of the of the wall 29) to substantially the second end 33 of the lateral enclosure 27 (e.g. to the wall 29). It may be desirable for some examples to have even larger numbers of control channel electrodes formed around the wall 29 and/or to have one or more control channel electrodes about the axis at a first height on the wall 29 in combination with one or more control channel electrodes about the axis at a different second height on the wall 29. Additional control channel electrodes may be provided at other heights on the wall 29.

As located on the wall 29, the control channel electrodes 35 need not be transparent. Hence, the control channel electrodes 35 can be formed of any suitable metallic conductor such as Copper, Aluminum, any suitable non-metallic conductor, etc. If transparency is desired for a particular application, the control channel electrodes 35 may be formed of a conductor that is transparent at least with respect to the light wavelengths of interest for the particular application, e.g. nano-wire mesh, Indium Tin Oxide (ITO), Aluminum-doped Zinc Oxide (AZO) or other transparent conductive oxide (TCO), etc.

The capsule 11 of the electrowetting cell 10 also has a common electrode 39. By way of example only, the common electrode 39 appears as a conductive ring around the walled part of the enclosure 27 formed on a part of the substrate 13 that is exposed to fluid within the cell, e.g. in the volume encompassed by the spacer and between the first end the first end of the wall 29 of the lateral enclosure 27 and the transparent axial end wall 41 formed by a surface of the transparent plate 15. In such a location, the common electrode 39 may be formed of metal or other suitable conductor and need not be transparent. The common electrode 39 may be formed in a variety of other ways, for example, by a transparent conductor (e.g. nano-wire mesh, ITO, AZO or other TCO, etc.) on a suitable area of the transparent wall 41 formed by the surface of the transparent plate 15. As another alternative example, the common electrode 39 may be formed as a wire lead extending through the plate 15 or the substrate 13 to a location where a section of the wire lead is exposed for contact with the first fluid 19 (but not in contact with any of the other electrodes of the cell 10).

The first transparent plate 15 (with the first transparent axial end wall 41) of the capsule 11 of the electrowetting cell 10 is coupled to the first axial end 31 of the lateral enclosure 27 to seal the first axial end 31 relative to the fluids contained within the electrowetting cell 10. The plate/wall could be coupled to the first axial end 31 of the lateral enclosure 27 in a variety of ways. The plate 15, for example, may be an integral part of the substrate 13. By way of another example, the plate 15 may be located in the opening of the wall 29 at the first axial end 31 of the lateral enclosure 27 and bonded in place by a suitable sealing material, such as glue or epoxy. In the example, however, the first transparent plate 15 (with the first transparent wall 41) is attached to the spacer 23 in a fluid tight manner (e.g. by an external clamp or the like (not shown) applying pressure to hold the plate 15 against the spacer 23 and the spacer 23 against the adjacent surface of the substrate 13). The spacer 23 in the example has an indentation on its opposite surface filled with the O-ring type seal 25. The seal 25 may be formed of synthetic rubber or the like. The transparent plate 15 may be sealed directly to the substrate 13 by suitable techniques. The transparent plate 41, however, may be coupled to the substrate 13 by other seal structures (see e.g. U.S. patent application Ser. No. 15/661, 742, filed Aug. 3, 2017, entitled "Sealing and Lateral Pressure Compensation Structures Usable With Fluidic or Gaseous Material Containers;" U.S. patent application Ser. No. 15/479,857, filed Apr. 5, 2017, entitled "Electrowetting Assembly Technique and Cell Structure;" and U.S. patent application Ser. No. 15/674,040, filed Aug. 10, 2017, entitled "Electrowetting Cell Constructs," the entire contents of all of which are incorporated herein by reference). The first transparent plate 15 may be a glass, an acrylic, a plastic, etc. that is sufficiently transparent at least with respect to the wavelength range of light expected to pass through the active optical area of the cell 10 (in the axial direction), for any given application of the cell 10.

The spacer 23 may be a metal, such as bronze, or any other material that is sufficiently rigid, impervious to the particularly types of fluids 19, 21 contained in the capsule 11. Depending on the type/location of the common electrode and/or the type of circuit board or other electrical lead configuration for that electrode, there also may be some cell structures in which the spacer will be conductive. For some applications, e.g. with high intensity light passing through the active optical area of the cell 10, the material of the spacer may also be chosen for resistance to the effects of temperature and/or pressure. If included, the O-ring seal 25 may be an appropriately shaped/sized ring of a synthetic rubber or similar material that is sufficiently compressible and is inert with respect to the fluids 19, 21 and any materials of the cell 10 that may contact the O-ring seal 25. An example of a suitable flexible material is Viton™ available for example from Eagle Elastomer Inc., although other rubber-based materials or flexible plastics may be suitable.

A second transparent plate 17 (including a second transparent axial end wall 43) is coupled to the second axial end 33 of the lateral enclosure 27, opposite the first transparent wall 41. The second transparent plate 17, having the second transparent wall 43, seals the second axial end 33 of the lateral enclosure 27 with respect to fluids contained within the enclosure of the cell 10. The second transparent plate 17 may be coupled to the substrate/enclosure in any of the ways discussed above relative to the coupling of the first transparent plate 15. In the illustrated example, the second transparent plate 17 is pressure fit for a tight seal within an opening of the substrate 13 at the second axial end 33 of the lateral enclosure 27.

The second transparent plate 17 be a glass, an acrylic, a plastic, etc. that is sufficiently transparent at least with respect to the wavelength range of light expected to pass through the active optical area of the cell 10 (in the axial direction), for any given application of the cell 10. Although the plates 15, 17 are transparent in the example, there may be cell configurations in which at least one plate is not transparent, e.g. a plate is reflective to configure a cell for a reflective application instead of a transmissive application.

For many applications, the substrate 13 may not need to be transparent. In such a case, the substrate 13 may be an opaque ceramic or plastic or the like. Alternatively, the substrate 13 may be transparent with respect to the relevant light wavelengths; in which case, the substrate 13 may be formed of a transparent material of one of the types discussed by way of examples above relative to the plates 15 and 17.

The lateral wall 29 extends at least partially between the end walls 41 and 43. In the example, the lateral wall 29 extends from the wall 43 toward the wall 41 but only as far as the opposite surface of the substrate 13. If the transparent plate 15 were mounted directly on the surface of the substrate 13 (without a spacer like the spacer 23), then the wall 29 would extend from the wall 43 to the wall 41. If the transparent plate 15 were formed as a plug within the well formed in the substrate 13, the lateral wall 29 would extend from the wall 43 to the wall 41 but not all the way to the opposite surface of the substrate 13. Other arrangements of the lateral and end walls also may be used.

The electrowetting cell 10 further includes at least one external-force compensation electrode 45 formed in or on a surface of the second transparent plate 17. The external-force compensation electrodes 45 are formed on one of the transparent plates, in this case the plate 17, adjacent to the non-conductive fluid 19. Optionally, the external-force compensation may be covered by a dielectric layer. When voltage is applied across each external-force compensation electrode 45 and the common electrode 39, the non-conductive fluid 19 and any dielectric film if provided on the electrode 45 together form the dielectric of the capacitive system within the cell with respect to the particular electrode 45. The conductive fluid 21 acts as an electrical extension of the common electrode 39. Charge builds up on the electrode 45, and the electric field essentially attracts or repels the conductive fluid 21 relative to the particular external-force compensation electrode 45. Whether the electrical force is attractive or repellent depends on the polarity of the charge (and thus the voltage polarity) on the electrode 45. The magnitude of the electrical force on the conductive fluid 21 depends on the amount of the charge (and thus the voltage amplitude) on the electrode 45.

In the first example (see e.g. FIG. 2), the cell 10 includes a substantial number of external-force compensation electrodes 45. The electrodes 45 may be formed at the transparent plate 17 in a variety of ways, for example, at or somewhat behind the wall 43 (e.g. recessed or embedded in the plate 17). In the illustrated example, however, the external-force compensation electrodes 45 are formed as conductive pads deposited or plated onto the transparent wall surface 43 of the plate 17, as also shown in the side view of the transparent plate 17 with the external-force compensation electrodes 45 in FIG. 3. The use of a substantial number of external-force compensation electrodes 45 provides the ability to apply electrical compensation forces at a number of locations, thereby providing higher resolution control of the compensation effects.

It may be conceivable that the force compensation electrodes 45 might be located in a particular cell design so as to not necessarily be transparent, and for such a configuration, those electrodes could be formed of metal or like as discussed above relative to the control channel electrodes 35. In the example shown, the force compensation electrodes 45 are formed on the transparent plate 17 and extend across some or all of the transparent wall 43 perpendicular to the optical axis in the example, therefore, the force compensation electrodes 45 are transparent at least with respect to the light wavelengths of interest for the particular application of the cell 10. The external-force compensation electrodes are formed of a suitable transparent conductor, e.g. nano-wire mesh, ITO, AZO or other TCO, etc.

As discussed in more detail later, in examples with multiple force compensation electrodes like shown at 45 in FIGS. 2 to 4, the individual compensation electrodes 45 are individually addressable. A system incorporating such a cell applies independent compensation voltages in amounts and to particular ones of the compensation electrodes 45 to implement desired compensation for distortion of an intended fluid meniscus shape due to external force such as gravity and/or orientation of the cell 10. Such independent voltage control involves a separate electrical connection for circuitry (not shown in FIGS. 1 to 4) to each of the external-force compensation electrodes 45 in the electrowetting cell 10.

A variety of different techniques/structural arrangements may be used to provide electrical connections to the external-force the compensation electrodes 45 on the one plate 17 in the example cell 10 of FIGS. 1 to 4. One approach would involve routing traces across transparent wall 43 to the edge of the plate 17, in between the various electrodes 45. The traces would be formed of the same transparent conductor as the electrodes 45. At the edge, the traces could be wrapped around to the bottom of the plate 17, for connection to external circuitry at the edge of the plate 17 or for contact with matching traces running across the lower surface of the substrate 13 to contact pads on the bottom of the main substrate 13. Depending on materials used, another alternative approach might use vias through the plate 17 for conductors connected to the electrodes 45 and traces from the conductors in the vias across the bottom surface of the plate 17 (and possibly across the lower surface of the substrate 130 to contact pads for electrical circuit board connections. A still further approach could use vias through the substrate 13 to connect to the traces at the edge of the plate 17.

The control channel electrodes 35 and the external-force compensation electrodes 45 do not contact any fluid in the example electrowetting cell 10. For that purpose, in the example with surface mounted electrodes 35 and 45, although not separately shown, a dielectric layer covers those electrodes. The dielectric, at least in the area thereof covering the force compensation electrodes 45, in at least some examples, would be transparent with respect to the relevant light wavelength range. In such an example, a transparent dielectric layer covers all surfaces of the electrodes 35 and 45 that otherwise would be exposed to fluid within the electrowetting cell. The dielectric also may be hydrophobic. For optical applications of the electrowetting cell in which light may pass through the enclosure in the space around the optical axis, an example of a suitable transparent material is Parylene C, although other transparent dielectric materials may be used. The Parylene C or other dielectric material may be applied to form the dielectric layer over the relevant surfaces of the electrode 35 and 45 in a variety of different ways. In some cases a non-transparent dielectric material may be used/applicable. Also, for some applications and/or cell configurations of the cell, the dielectric material may be reflective.

FIG. 4 is an enlarged top view of the transparent plate 17 showing the first example layout of the external-force compensation electrodes 45 on the transparent plate 17. As shown, this first layout includes five concentric circles or rings of electrodes 45. Inside the innermost ring, there are five additional electrodes in a cross or plus sign (+) type pattern. The external-force compensation electrodes are distributed across the area of the transparent wall 43 (of the plate 17) across the optical axis (see also FIG. 1).

There are gaps between/amongst the external-force compensation electrodes 45 to provide electrical isolation between the electrodes. In this example, the external-force compensation electrodes 45 receive independently controllable voltages. The example illustrated in FIG. 2 uses square shaped external-force compensation electrodes 45. Also, all of the electrodes 45 have the same size and shape. That shape and uniformity of shape are shown by way of a non-limiting example, only. The compensation electrodes in alternative examples have a variety of other shapes, such as square with rounded corners, round, oval, rectangular, triangular, hexagonal, octagonal, etc. For a particular cell structure, individual external-force compensation electrodes may have shapes and/or sizes thereof that differ among the electrodes 45 of the set.

Figure 5:
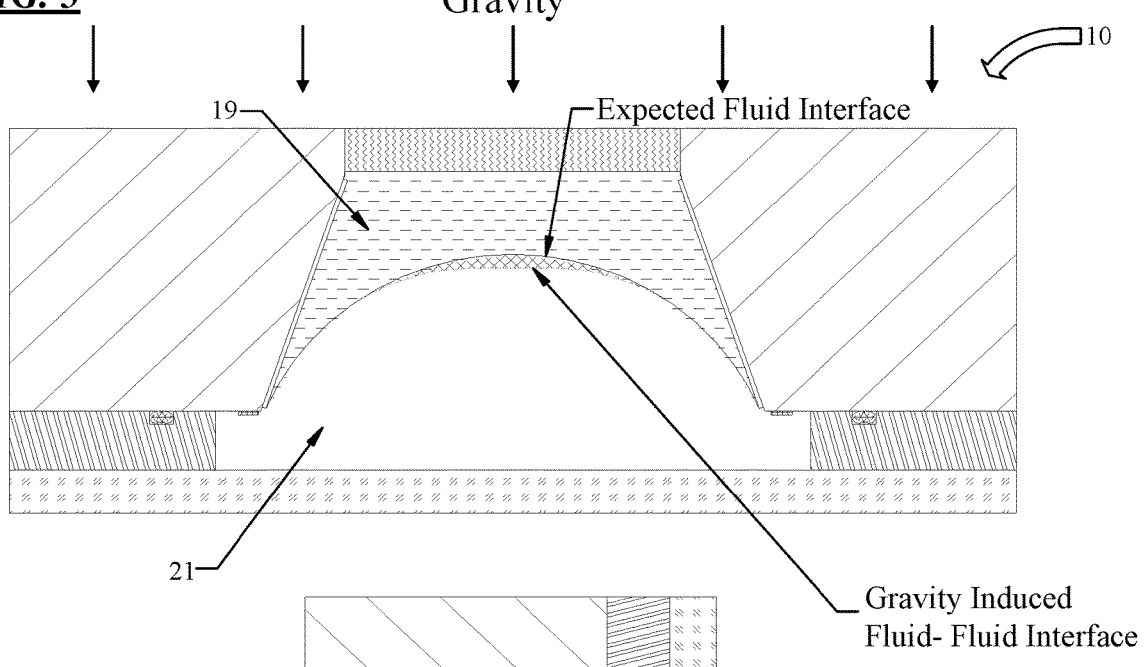
FIG. 5 is a cross sectional view of the example cell of FIG. 1, that also depicts the two fluids of the cell and shows the cell in a first orientation for light passing through the cell in a vertical direction.
Figure 6:
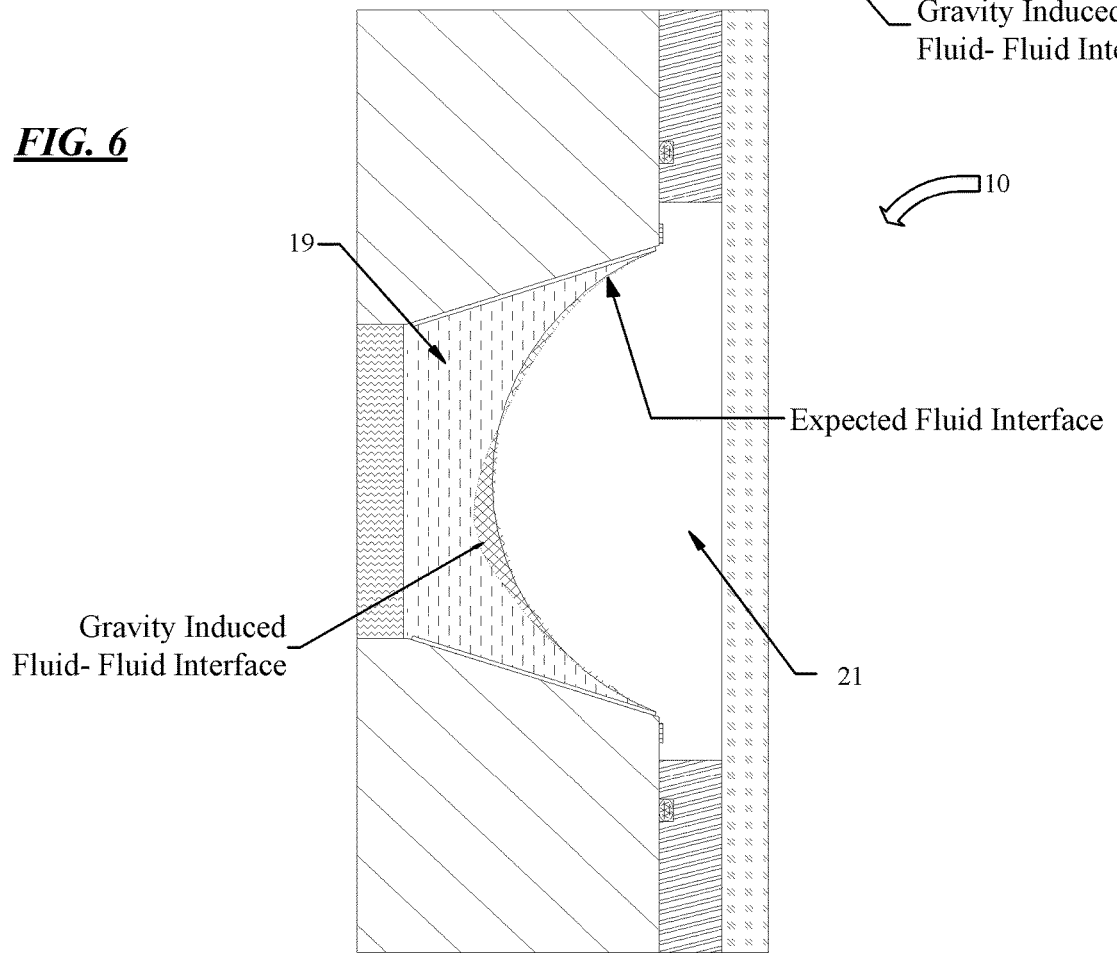
FIG. 6 shows the cell of FIG. 5 in a second orientation for light passing through the cell in a horizontal direction.

As shown in FIGS. 5 and 6, the electrowetting cell 10 also includes a first fluid 19 inside the capsule 11, located at the sealed second axial end 33 of the lateral enclosure 27 (see also FIG. 1) in proximity to the second transparent wall 43. The first fluid 19 is relatively non-conductive. A second fluid 29 fills the remainder of the capsule 11 to the first transparent wall 41. The second fluid 29 is relatively conductive and in contact with the common electrode 39. The first fluid 19 and the second fluid 21 are immiscible with respect to each other, in our example. Although not required for all applications of the cell 10, the two fluids 19, 21 may exhibit a difference in an optical characteristic, e.g. difference in refractive index and/or difference in reflectivity versus transmissivity.

Assume for purposes of further discussion of an example that the fluids 19, 21 in the example are immiscible and have different refractive indexes. The first (non-conductive, e.g. insulating) fluid 19 may be a suitable oil. Suitable fluids for use as the second (conductive) fluid 21 include alcohols, glycols, ionic liquids, or other suitable liquid materials that can conduct electrical or ionic charges adequately to enable the electrowetting operations described herein. Conducting fluids may contain salts or other additives to alter their electrical conductivities. Specific examples of relatively insulating fluids that may be used include relatively non-conductive 'oil,' liquids such as Dow Corning OS-20, dodecane, and silicone oil. Specific examples of relatively conductive fluids that may be used include aqueous solutions for the more conductive liquid, such as: aqueous mixtures of sodium dodecyl sulfate (SDS), aqueous mixtures of potassium chloride (KCl), and propylene glycol (PG).

As will be described in more detail later with regard to FIGS. 11 to 13, a system having a variable optic cell like electrowetting cell 10 also includes a cell driver system, for example having at least one control channel driver and at least one compensation driver. The compensation driver is coupled to the external-force compensation electrode(s) 45. This driver is configured to apply a compensation voltage to the external-force compensation electrode, for example, based sensing a condition of the cell indicative of an external force capable of causing distortion of a meniscus between the two fluids. The sensed condition may be an electric condition of one or more of the two fluids of the electrowetting cell. Means for sensing such an electric condition of the fluid(s) may be a separate measuring circuit or a measuring circuit implemented in the driver system and coupled to one or more of the compensation electrodes (as discussed in more detailed later relative to FIG. 13). The sensing may detect orientation of the electrowetting cell to adjust the compensation (in addition to sensing a condition related to the fluid(s)). Orientation, for example, might be sensed by means of an orientation detector coupled to the electrowetting cell. In such a system, the processor is coupled to the driver system. The processor controls the driver system to apply voltage to each control channel electrode to establish a selected optical state of the fluids in the electrowetting cell. The processor also sets the compensation voltage applied to the external-force compensation electrode(s), to compensate for distortion of the actual state of the fluids in the electrowetting cell due to an external force on the fluids, for example, in a manner based on the sensed condition.

FIGS. 5 and 6 also show examples of orientations of the cell 10 and different types of gravity induced distortions for those different cell orientations. The shape of the deformation of the meniscus between the fluids due to external force and/or orientation may be primarily due to using two immiscible fluids with different densities, although deformation may be caused by other factors. Where a density mismatch is a primary cause of a misshaped meniscus, the deformation becomes more pronounced as the density difference increases or as the cell 10 becomes larger in diameter for a circular cell (or larger dimensions/area for other shaped cells). If the cell orientation is as shown in FIG. 5 and FIG. 6, the oil (non-conductive fluid 19) has a lower density than the water (conducting fluid 21) and will create meniscus shapes similar to those in these illustrated orientations. However, if the density of the oil (non-conductive fluid) 19 is higher than the conductive fluid 21, the center of the meniscus actually rises above the Expected Fluid Interface and flattens out toward the sidewalls, around the center of the interface. This could still be controlled with the compensation electrodes, or potentially shaped slightly with the wall electrodes. In FIG. 6, regardless of the density difference, as long as it is not so different that the non-conductive fluid detaches from the side walls, the compensation electrodes should be able to mostly control the shape to mitigate distortion. These types of deformation issues may begin to arise in cells of sizes around 5 mm, although without the compensation approaches discussed herein, such distortions increase and are more difficult to work with as the cell size further increases.

Figure 10:
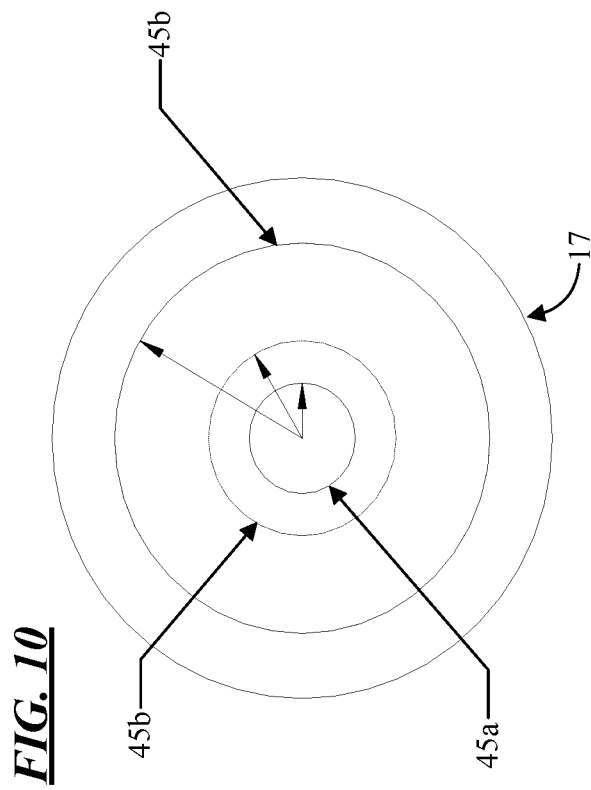
FIGS. 9 and 10 show further examples of other alternative layouts of one or more external-force compensation electrodes, either of which may be implemented in an electrowetting cell otherwise similar to the that of FIG. 1.

In an orientation like that shown in FIG. 5 (or the inverse orientation like that shown in FIG. 1) it may be possible to compensate for the external force using a single electrode as discussed later with regard to FIG. 10. If the cell 10 will have or possibly change to an orientation more like that shown in FIG. 6, compensation is likely more effective if the cell has more complex control via a number of electrodes 45 with a corresponding voltage gradient applied amongst the respective electrodes 45, as discussed later with regard to FIG. 4, 7, 8, or 9.

FIG. 5 is a cross sectional view of the example cell 10 of FIG. 1 in an orientation that is inverse to the orientation shown in FIG. 1. In a luminaire application, for example, in this orientation, the cell 10 might receive light vertically from an artificial light source located above the cell 10.

The cell 10 and fluids 19, 21 contained therein would be subject to a downward external force due to gravity. The solid-line curve represents an "Expected" fluid-to-fluid interface that is intended to result from application of particular control voltages to the control channel electrodes 35 (see FIGS. 1 and 2) of the electrowetting cell 10. The crisscross shading (below the solid-line curve) represents a distortion of the fluid-to-fluid interface due to gravity. For example, the force of gravity may cause the meniscus shape at the interface between the fluids 19, 21 to droop from the solid-line "Expected" curve to the lower edge of the crisscross shading. The lower edge of the crisscross shading would then be the actual the fluid-to-fluid interface induced by gravity; and the area indicated by the crisscross shading would represent the amount of gravity induced distortion.

To compensate for the gravity induced distortion, a driver system would be controlled to apply appropriate voltages to some or all of the external-force compensation electrodes 45 to create electrical compensation forces on the conductive fluid 21, in this example, to pull portions of the fluid 21 upward against the force of gravity and thereby achieve a meniscus or interface shape that more closely approximates the "Expected" fluid interface shaped intended to result from application of particular control voltages to the control channel electrodes 35 (see FIGS. 1 and 2) of the electrowetting cell 10.

FIG. 6 shows the cell 10 of FIGS. 1 and 5 in another orientation for processing light flowing through the optic in a horizontal direction. For example, for a luminaire for horizontal light output or for a vehicle headlamp application, the electrowetting cell 10 might receive light horizontally from an artificial light source located to the left of the cell 10.

In this second orientation example, the cell 10 and fluids 19, 21 contained therein would again be subject to a downward external force due to gravity. The solid-line curve represents an "Expected" fluid-to-fluid interface that is intended to result from application of particular control voltages to the control channel electrodes 35 (see FIGS. 1 and 2) of the electrowetting cell 10. The crisscross shading represents a distortion of the fluid-to-fluid interface due to gravity. In this horizontal light flow example, the distortion represented by the crisscross shading is more complex than in the example of FIG. 5. In the orientation of FIG. 6, higher along the meniscus, some of the non-conductive fluid 19 droops down from the intended "Expected" interface curve (into space intended to be occupied by the conductive fluid 21). Further down along the meniscus, some of the conductive fluid 21 droops down from the intended "Expected" interface curve (into space intended to be occupied by the non-conductive fluid 19). The edge of the crisscross shading opposite the solid line "Expected" curve would then be the actual the fluid-to-fluid interface induced by gravity; and the areas indicated by the crisscross shading would represent the amounts of gravity induced distortion along different portions of the meniscus.

To compensate for the gravity induced distortion of FIG. 6, the driver system would be controlled to apply appropriate voltages to some or all of the external-force compensation electrodes 45 to create electrical compensation forces on the conductive fluid 21. In this example, some of the electrical compensation forces pull portions of the fluid 21 upward and to the left to counter the force of gravity on the non-conductive fluid 19 in the region along the upper portion of the fluid interface. Other electrical compensation forces pull portions of the fluid 21 upward and to the right to counter the force of gravity on the conductive fluid 21 in the region along the middle and lower portion of the fluid interface which would, in turn, passively deform the lower portion of the of the conductive fluid and the non-conductive fluid. Again, the compensation is intended to achieve a meniscus or interface shape that more closely approximates the "Expected" fluid interface shaped intended to result from application of particular control voltages to the control channel electrodes 35 (see FIGS. 1 and 2) of the electrowetting cell 10.

The degree to which the electrical force(s) produced via the external-force compensation electrodes 45 could compensate for the distortion and achieve the intended target shape is dependent on a number of factors, such as the size of the cell 10, the number of electrodes 45, the size of the electrodes 45, and the like. A higher number of electrodes 45 of smaller sizes provides a greater resolution for applying compensation forces and thus more ability to adjustably counter distortion due to the external force. Large numbers of electrodes, however, complicate manufacture as well as the design of associated circuitry to drive the larger number of electrodes, which may not be justified for all applications of the electrowetting cell 10.

Although control of the external-force compensation voltages applied to the electrodes 45 could be open-ended, operation of the electrowetting cell 10 in a system example typically will involve sensing of some condition that relates to distortion of the meniscus shape at the interface of the two fluids 19, 21. Voltage applied to each external-force compensation electrode 45 then can be based at least in part on the sensed condition. One approach uses an additional sensor associated with the cell, such as an orientation sensor coupled to the cell to detect orientation of the cell 10. Voltage applied to each external-force compensation electrode 45 then can be based at least in part on the sensed orientation.

Another approach (instead of or in addition to orientation detection) involves detecting an electrical condition of one or more of the fluids 19, 21. An example of the later approach might involve sensing charge/voltage across the effective capacitor in the vicinity of one or more of the external-force compensation electrodes 45 (e.g. across the capacitive system from one the external-force compensation electrodes 45 to the common electrode 39). Variations in capacitances are related to the state of the fluids and thus the shape of the meniscus and can be used as a feedback measurement for adjustment of the voltage(s) applied to the external-force compensation electrode(s) 45. The value for the sensed charge/voltage across the effective capacitor at an electrode 45 can be processed to determine capacitance. Voltage applied to each external-force compensation electrode 45 then can be based at least in part on determined capacitance in the vicinity of the particular electrode 45. Compensation voltages may be obtained from a lookup table based on differences between the sensed charge/voltage or determined capacitance and expected charge/voltage or as a function of sensed and expected values. Examples of techniques to obtain the compensation voltages are described in more detail later.

Separate sensing electrodes (not shown) could be used. In an example of such an arrangement, some electrodes in an array or layout might be for control and others for sensing. Another approach for providing separate electrodes may use two electrodes where FIG. 2 shows each square, e.g. by dividing each square into two separate side by side electrodes or by having two concentric electrodes at each square location. In an example discussed in more detail later, each external-force compensation electrode 45 also is utilized as a sensing electrode, that is to say, to sense the charge/voltage between the respective external-force compensation electrode 45 and the common electrode 39. The voltage applied to a particular external-force compensation electrode 45 would be based on part of the capacitance determined from the measurement of voltage/charge taken using that particular external-force compensation electrode 45.

FIG. 7 shows the four control channel electrodes 35 and an alternative example of a layout of the external-force compensation electrodes 457, which may be implemented in an electrowetting cell otherwise similar to the that of FIG. 1. As shown, this layout includes five concentric circles or rings of electrodes 457. That center-most circle may be another compensation electrode. Alternatively, the area inside and around the innermost ring may be free of compensation electrodes. Except for that innermost area, the external-force compensation electrodes 457 are distributed across the area of the transparent wall on the transparent plate and across the optical axis (see also FIG. 1). There are gaps between/amongst the external-force compensation electrodes 457 to provide electrical isolation between the electrodes. In this example, the external-force compensation electrodes 457 receive independently controllable voltages.

FIG. 8 shows the four control channel electrodes 35 and another alternative example of a layout of the external-force compensation electrodes 458, which may be implemented in an electrowetting cell otherwise similar to the that of FIG. 1. As shown, the layout of electrodes 458 of FIG. 8 utilizes rows and columns of electrodes. In the drawing, the rows and columns are aligned approximately parallel to the lateral and longitudinal axes formed through the gaps between the control channel electrodes 35, although other relative alignments of electrodes 35 and 458 may be used. There are gaps between/amongst the external-force compensation electrodes 458 to provide electrical isolation between the electrodes. As in earlier examples, the external-force compensation electrodes 458 receive independently controllable voltages.

Figure 2:
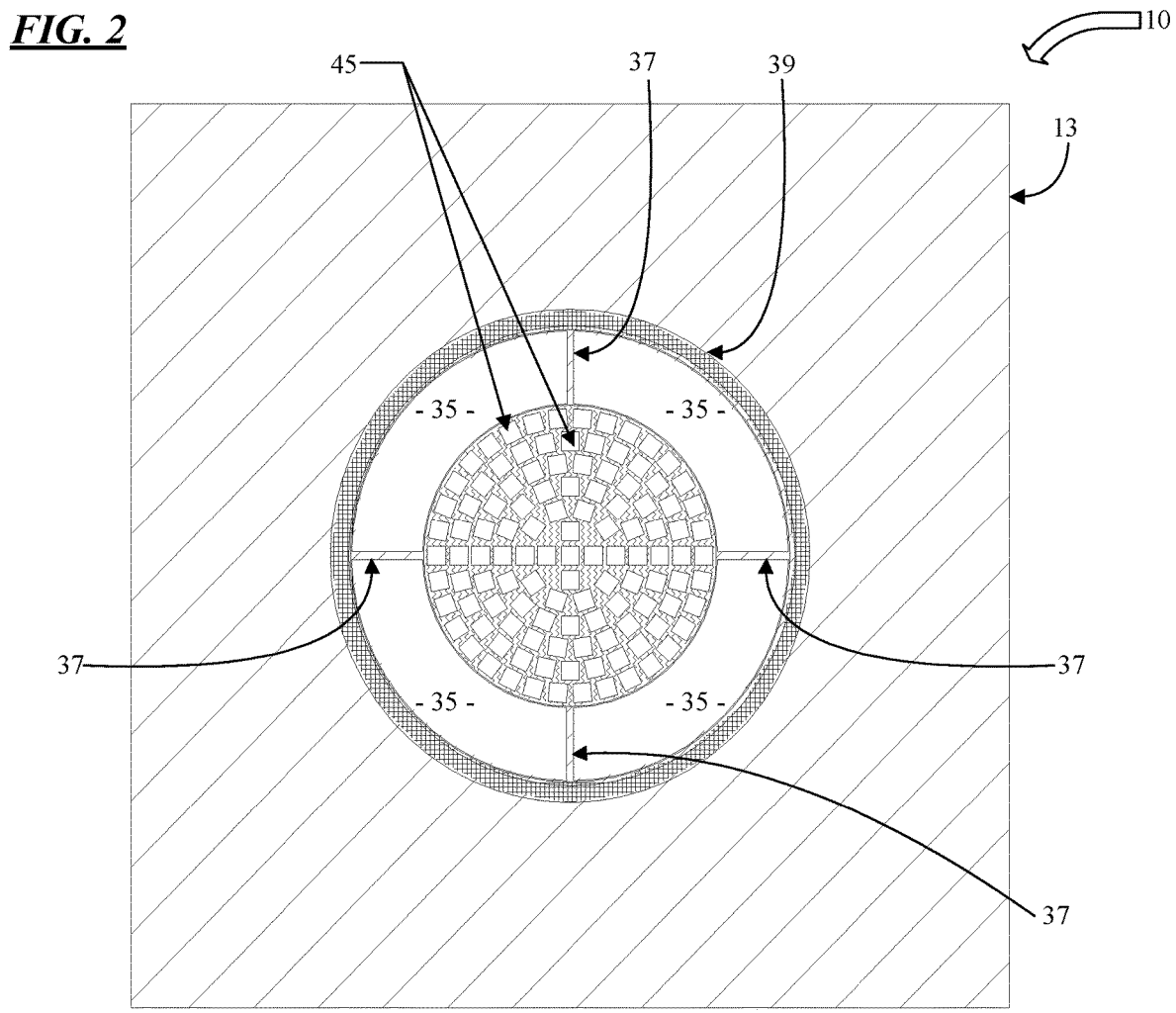
FIG. 2 is a top view of the example of an electrowetting cell of FIG. 1, with one of the plates, a spacer and an O-ring seal removed to facilitate illustration of other elements of the cell.

Like the example of FIGS. 2 and 4, the examples illustrated in FIGS. 7 and 8 use square shaped external-force compensation electrodes 457 or 458; and those electrodes all have the same size and shape. That shape and uniformity of shape are shown by way of a non-limiting example, only. The compensation electrodes 457 or 458 may have other shapes and relative sizes as discussed above relative to FIGS. 2 and 4.

FIGS. 2, 4 and 7 to 10 show just a few examples of compensation electrode arrangements of multiple compensation electrodes in example array patterns. Still other shapes, relative sizes, array patterns of compensation electrodes may be used.

Figure 9:
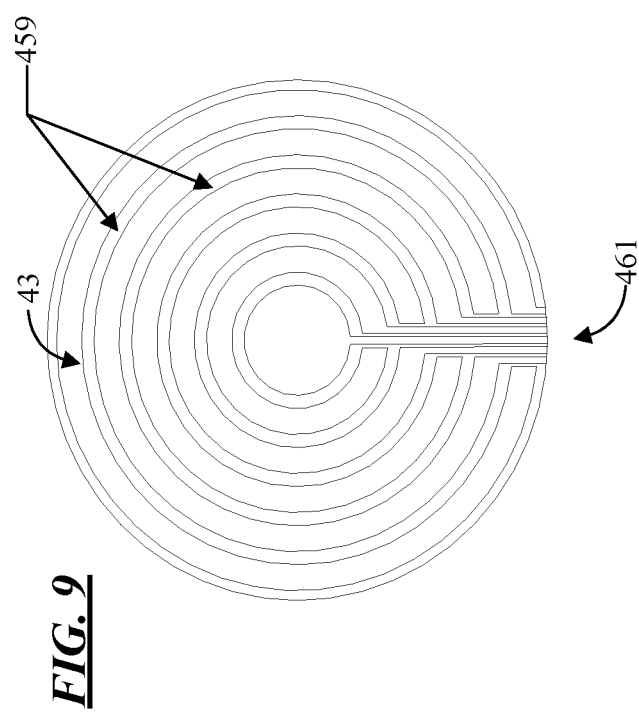

FIG. 9 shows a further example of an alternative layout of the external-force compensation electrodes, which may be implemented in an electrowetting cell otherwise similar to the that of FIG. 1. This layout includes electrodes 459 in the form of generally concentric rings. At one location on the end wall 43, the conductors forming the electrodes 459 also form leads 461 that extend from the respective ring electrodes 459 to an edge of the end wall 43 and/or the plate on which the electrodes are formed, to enable electrical connections to the external-force compensation electrodes 459. As in earlier examples, the external-force compensation electrodes 459 receive independently controllable voltages.

The examples discussed so far have used a number of compensation electrodes on an end wall in each electrowetting cell. For some applications, it may be sufficient to have a single external-force compensation electrode on the end wall of an electrowetting cell. FIG. 10 shows a further example of electrode layout, which may be implemented in an electrowetting cell otherwise similar to the that of FIG. 1. In this example, the end wall on the plate 17 has a single external-force compensation electrode. The diameter of the single electrode, however may be chosen to suit a particular application of the electrowetting cell; and the circles 45a, 45b and 45c represent three different examples of a single central electrode of three different diameters. The example assumes a circular electrode shape, although other shapes may be used in a single electrode type implementation. Unlike the earlier cell examples, compensation in an electrowetting cell having a single external-force compensation electrode would only need one drive voltage applied to that electrode.

The discussion so far has concentrated on examples of the structure and general operation of an electrowetting cell using force compensation electrodes. It may be helpful to consider an example of a system incorporating such a light shaping optic and associated electronic components.

Figure 11:
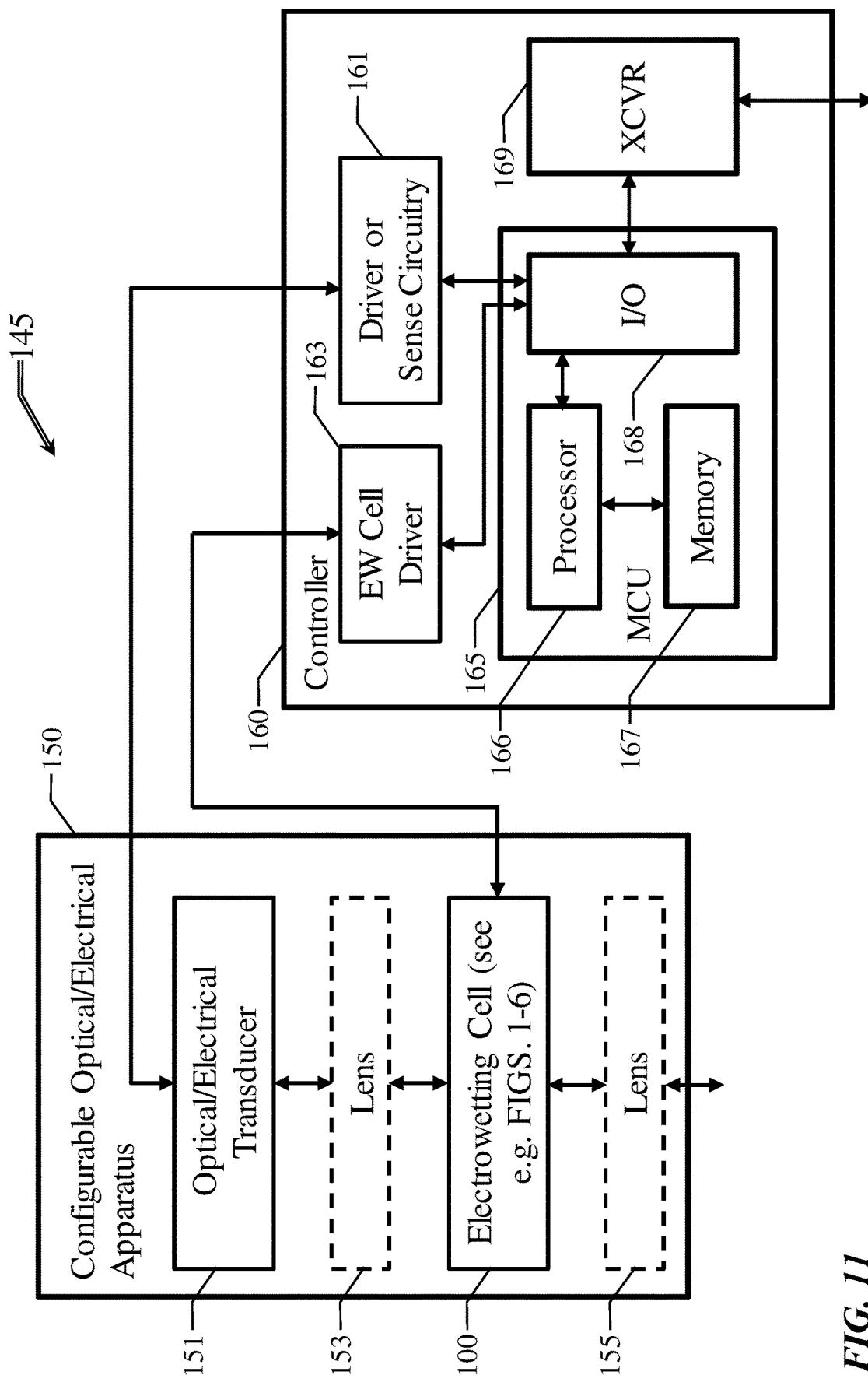
FIG. 11 is a simplified functional block diagram of a system combining an electrowetting cell like that of FIGS. 1-6 with an optical/electrical transducer and associated circuitry.

FIG. 11 is a simplified functional block diagram of a system 145, which includes a configurable optical/electrical apparatus 150 and a controller 160. The configurable optical/electrical apparatus 150 combines an electrowetting cell 100 like cell 10 of FIG. 1 or any of the other examples discussed above with an optical/electrical transducer 151. Although associated circuitry may be provided in the apparatus 150, the example shows circuitry in the controller 160, which may be somewhat separate from or even remote from the configurable optical/electrical apparatus 150.

An optical/electrical transducer 151 is a device that converts between forms of optical and electrical energy, for example, from optical energy to an electrical signal or from electrical energy to an optical output. Examples of optical-to-electrical transducers include various sensors or detectors, photovoltaic devices and the like. Optical-to-electrical transducers discussed herein are responsive to light, and the light may be visible light, ultraviolet light, infrared light, near infrared light or light in other portions of the optical spectrum.

Examples of electrical-to-optical transducers include various light emitters, although the emitted light may be in the visible spectrum or in other wavelength ranges. Suitable light generation sources for use as the transducer 151 include various conventional lamps, such as incandescent, fluorescent or halide lamps; one or more light emitting diodes (LEDs) of various types, such as traditional LEDs, organic LEDs (OLEDs), planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Any of these types of LEDS may (or may not) be packaged with or coupled to photo-luminescent materials, such as phosphors, to effectively shift wavelength(s) of some of the light produced by the actual LED chips. Of course, these light generation technologies are given by way of non-limiting examples, and other suitable light generation technologies may be used to implement the transducer 151.

When optical transducer 151 is a light source, the light source may use a single emitter to generate light or may combine light from some number of emitters that generate the light. A lamp or 'light bulb' is an example of a single source. An LED light engine may use a single output for a single source but typically combines light from multiple LED type emitters within the single light engine. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output. As such, the light source used as an emitter type of optical/electrical transducer 151 may or may not be pixelated for control purposes. The electrowetting cell 100 is controlled to selectively optically change or spatially (optically) modulate the light distribution output from the transducer and thus from the apparatus 150. The electrowetting cell 100 may support controlled beam steering, controlled beam shaping or a combination of controlled beam steering and shaping.

In another example, optical transducer 151 is an optical-to-electrical converter, that is to say, a light sensor or detector or a photovoltaic device. The overall apparatus 150 in such a case may be configured as an imager, other light responsive sensor, light responsive power source, or the like. The light detector may be an array of light detectors, a photo-detector such as a photodiode, or a photovoltaic device, depending on the desired function of optical/electrical apparatus 150. Other suitable light detectors for use as optical/electrical transducer 151 include charge-coupled device (CCD) arrays, complementary metal-oxide-semiconductor (CMOS) arrays, photomultipliers, image intensifiers, phototransistors, photo resistors, thermal imagers, and micro-electromechanical systems (MEMS) imagers. Nonetheless, virtually any detector of light may be used as the transducer 151 in an optical-to-electrical arrangement of apparatus 150. Suitable light detectors will be known to one of ordinary skill in the art from the description herein. The electrowetting cell 100 is controlled to selectively optically change or spatially (optically) modulate the field of view of light coming into the apparatus 150 for delivery to transducer 151. The electrowetting cell 100 may support controlled beam steering, controlled beam shaping or a combination of controlled beam steering and shaping, with respect to light from a field of intended view for the particular optical-to-electrical application of the apparatus 150.

While light source examples and light detector examples are described separately, it will be understood that both types of optical/electrical transducers 151 may be present in a single optical apparatus 150 and/or some optical transducers can serve both input and output functions (e.g. some LEDs can be multiplexed between the emitting operation and a light detection operation). Such a combined arrangement or operation, for example, may advantageously provide capabilities to reconfigure the light output distribution in accordance with a desired light detection pattern or field of view.

In an overall apparatus 150, with an optical/electrical transducer 151, the electrowetting cell 100 may have a lens on one side or the other side or have lenses on both sides, of the electrowetting cell 100, along the axis of the optical path through the cell 100 and to or from the transducer 151. Hence, FIG. 11 shows a dotted line (optional) example of a lens 153 between the transducer 151 and the electrowetting cell 100. Similarly, FIG. 11 shows a dotted line (optional) example of a lens 155 on the side of the electrowetting cell 100 opposite the transducer 151. In the example, the lenses 151 or 153 would be fixed lenses.

Various examples of arrangements of a spatial optical modulator (e.g. as an electrowetting cell) with one or more cascaded lenses are disclosed in U.S. patent application Ser. No. 15/228,414, filed Aug. 4, 2016, entitled "Configurable Optical Transducers Using An Optical Modulator And One Or More Lenses," the disclosure of which is entirely incorporated by reference.

Although not shown, additional optical processing elements may be provided in the apparatus 150. In a luminaire for general illumination or in another type of light emission device (e.g. a flash), for example, an emitter type transducer 151 may be coupled to the electrowetting lens 100 via a collimating optic, such as a total internal reflection (TIR) lens.

A transducer 151, such as a light emitter or a light detector, often connects to corresponding electrical circuitry to operate the particular type of transducer, e.g. a driver circuit to supply power to an emitter or a sense circuit to process an output signal from a detector (and provide power to the detector if necessary). The controller 160 includes an electrowetting (EW) driver 163 to selectively provide signals to the electrodes (e.g. voltages between respective control channel electrodes and the common electrode) to control the fluid state of the electrowetting cell 100. In the example, the drivers 160, 161 are separate from the transducer 151 and the cell(s) 100 driven by the respective drivers. Alternatively, one or more of the drivers may be more closely associated with respective transducer(s) or cell(s). For example, some or all of the driver circuitry for a particular apparatus 150 might be implemented in the apparatus 150. For example, a LED driver may be implemented on the board with LEDs forming an illumination light source and/or an EW cell driver may be implemented on a flexible circuit board incorporated in the cell 100.

To operate the transducer 151, the controller 160 includes corresponding driver or sense circuitry 161. The type of circuitry 161 would depend on the type of transducer 151.

The EW driver 163, for example, may be circuitry constructed/configured to apply direct current (DC) voltages or alternating current (AC) voltages or AC with a DC offset to each control channel electrodes. In the examples 100 of the cells above, having four control channel electrodes (e.g. electrodes 35 in FIG. 1) and a common electrode (e.g. 39 in FIG. 1), the EW driver 163 would have four separately controllable voltage output channels each having a connection through a respective contact to a respective one of the control channel electrodes. The EW driver 163, for example, also may be or include circuitry constructed/configured to apply direct current (DC) voltages or alternating current (AC) voltages or AC with a DC offset to each the one or more external-force compensation electrodes in the particular implementation of cell 100 (e.g. to each of the electrodes 45 in the example of FIGS. 1 to 6).

Each separately controllable voltage output channel of the EW driver 163, for control or external-force compensation, would also have a connection through the common contact to the common electrode of the electrowetting cell 100. Configuration of the circuitry of the EW driver 163 would be adapted to the particular electrical control strategy (e.g. to use AC, DC or a combination of AC and DC), the intended range(s) of fluid states, compensation strategy and thus to the beam steering and/or shaping capabilities of the electrowetting cell 100, and/or to any voltage or current limitations intended to minimize damage to the cell structure of components thereof during operation of the system 145.

In addition to the driver or sense circuitry 161 and the EW driver 163, the controller 160 in the example also includes a Micro-Control Unit (MCU) 165 (that includes a processor 166, one or more digital storage media such as memory 167 and appropriate input/output circuitry 168) and data and programming. These controller elements will be discussed in more detail, later.

Figure 12:
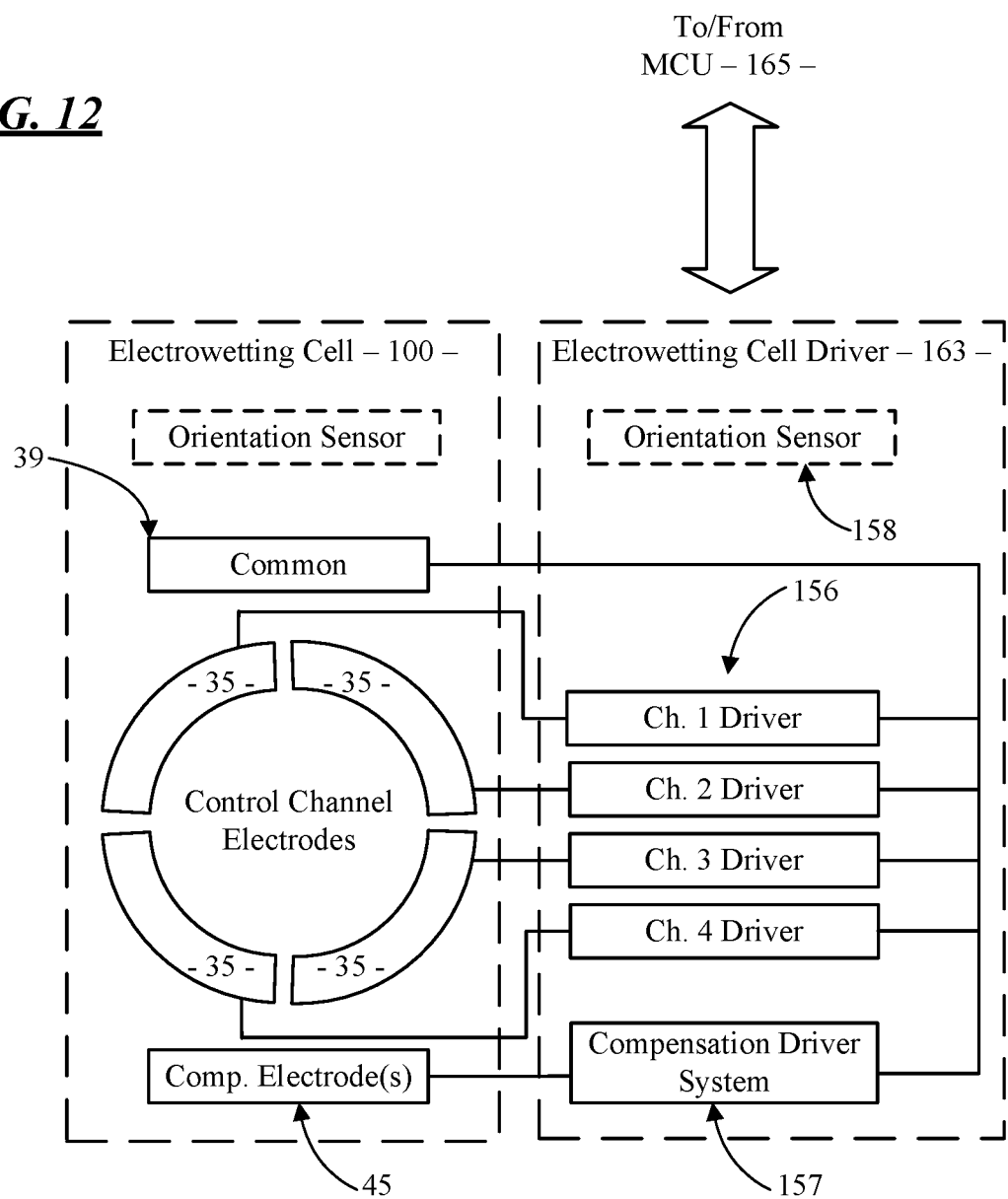
FIG. 12 is a simplified functional block diagram of the electrical components of the electrowetting cell (e.g. the electrodes) and the associated cell driver system.

FIG. 12 is a simplified functional block diagram of the electrical components of the electrowetting cell 100 (e.g. the electrodes) and the associated cell driver system 163. The cell 100 includes control channel electrodes 35, common electrode 39 and one or more external-force compensation electrode 45. These electrodes may be implemented in the same manner and function in a similar way as in the more structural examples of the electrowetting cells described above relative to FIGS. 1 to 10, hence, the use of the same reference numerals.

The electrowetting cell driver system 163 includes a number of control channel driver circuits 156. In the example, there is one control channel driver circuit 156 for each of the control channel electrodes 35. Each control channel driver circuit 156 connects between the common electrode 39 and the respective control channel electrode 35. Each control channel driver circuit 156 is a circuit, controlled by the MCU 165, to apply a selectable direct current (DC) voltage or alternating current (AC) voltage or AC with a DC offset to the respective control channel electrode 35. The control channel drivers 156 generate DC or generate AC waveforms of suitable amplitude, frequency and/or wave shape. The control channel drivers 156 may be implemented with Digital to Analog converters or other controllable analogue signal generators.

The electrowetting cell driver 163 also includes one or more compensation drivers, in the form of a compensation driver system 157 in the example. The compensation driver system 157 connects between the common electrode 39 and the external-force compensation electrode(s) 45. There may be a single driver circuit, for example if there is a single external-force compensation electrode 45. In examples like those shown in FIGS. 1 to 9, with multiple external-force compensation electrodes 45, the compensation driver system 157 would have a corresponding number of controllable output voltage channels to independently supply compensation voltage to each respective one of the external-force compensation electrodes 45. Such a multi-channel implementation of the driver system 157 could be a circuit with independent outputs or a system with multiple individually controllable drivers, as in the example described later with respect to FIG. 13.

Although connections are omitted for convenience, the control channel drivers 156 and the compensation driver system 157 are coupled to the MCU 165 to respond to instructions from the MCU 165 to apply various voltages to the respective electrodes 35, 45 (relative to the common electrode 39). The MCU 165 also receives a signal from at least one means for sensing a condition of the cell indicative of an external force capable of causing distortion of a meniscus between the two fluids. As will be more apparent in later drawings, the sensing detects an internal condition related to the fluids, such as charge, voltage or capacitance, which may provide feedback related to shape of the meniscus interface between the two fluids. Various sensing technologies may be used. Specific examples utilize sensing circuitry coupled to the compensation electrodes 45, which may be integrated into the driver(s) for those electrodes.

In the example of FIG. 12, the MCU 165 also is coupled to an optional orientation sensor 158, for sensing an orientation of the electrowetting cell 100. The orientation sensor 158 may be an accelerometer, gyroscope, or the like. As shown, the orientation sensor 158 is included in the electrowetting cell driver system 163, e.g. for an implementation in which the driver system 163 is built into or closely coupled to the electrowetting cell 100. If the cell 100 and the driver system 163 are somewhat separate, the orientation sensor may be located on or within the structure of the electrowetting cell 100, as represented by the dotted line orientation sensor shown in FIG. 12.

Instead of or in addition to sensing orientation, the MCU 165 may control the compensation voltages that the driver system 157 applies to the external-force compensation electrodes 45 in response to sensing of an electric condition of one or more of the two fluids of the electrowetting cell. Sensing of the electric condition of a fluid may utilize a separate sensor or system of sensors (not shown). In the example shown, the sensing of the electric condition of a fluid is a function of the compensation driver system 157. Hence, the MCU is coupled to the compensation driver system 157 to also receive a signal or data representing the sensed fluid condition.

Based on sensing of the fluid condition and/or sensing cell orientation, the MCU 165 instructs the compensation driver system 157 to apply voltage to an appropriate one or more of the compensation electrodes 45, to compensate for distortion of the actual state of the fluids in the electrowetting cell due to an external force on the fluids, for example, in a manner based on the sensing. At a high level, the MCU 165 obtains a measurement of a fluid characteristic that relates to deformation of the meniscus due to gravity or the like, e.g. that relates to impedance or capacitance. Then, based on the measured result, the MCU causes the compensation driver system 157 to adjust the voltage applied to the electrode(s) 45 relative to ground at common electrode 39 so as to compensate for distortion of the meniscus.

Figure 13:
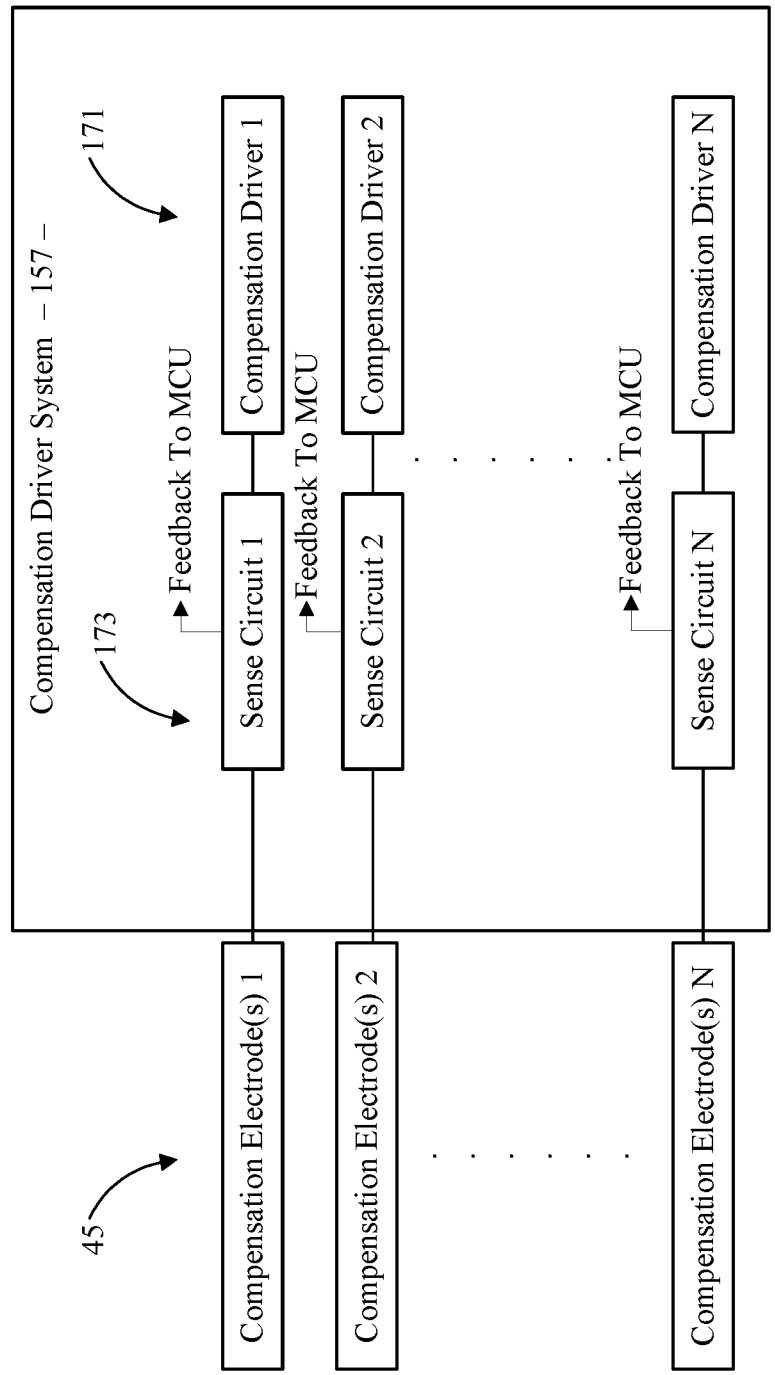
FIG. 13 is a simplified functional block diagram of the compensation driver system (portion of the cell driver system) and a number of compensation electrodes of the electrowetting cell.

FIG. 13 is a simplified functional block diagram of an example of the compensation driver system 157. In the example, the system 157 includes a number of individual compensation drivers 171 (up to N, corresponding to the number N of compensation electrodes 45). Each compensation driver 171 feeds a compensation voltage to a respective compensation electrode 45 via a sense circuit 173. The sense circuit 173 will provide feedback to the MCU 165 as well as feed voltage to the respective compensation electrode 45.

The compensation drivers 171 generate DC or generate AC waveforms of suitable amplitude, frequency and/or wave shape. The compensation drivers may be implemented with Digital to Analog converters or other controllable analogue signal generators. Although each compensation driver 171 may have a processor and memory (e.g. for relevant control data or algorithm programming), the example assumes that the compensation drivers 171 are controlled by the higher level logic implemented by the programming and control data of the MCU 165. Typically, the compensation voltage is AC, and further discussion of a specific example assumes use of AC compensation with sensing related to charge/voltage as a measure related to capacitance. An alternate type of voltage used, e.g. DC or DC with an offset instead of AC, may change the type of sensing. In an example, each compensation driver 171 generates AC in the form of a square wave.

At a high level, in the AC square wave example, a sensing circuit is used to measure the charge time and enable the processor to calculate the time constant of the charged fluidic capacitor between each compensation electrode 45 and the common electrode 39. Adjustments are made to the voltage at each compensation electrode 45 until the expected sensing value (calculated time constant which correlates to capacitance) is measured to within some predetermined accuracy of a reference value associated with the Expected fluid interface shape.

The sense circuit, for example, may be a basic RC circuit where both the resistor and capacitor are of known values. Since the drive voltage is known (to a certain accuracy) based on instructions from the MCU 165, the voltage between the resistor and capacitor will be monitored and sampled at a rate of at least 10× the drive frequency (if $F_{drive}$=1,000 Hz, $F_{sample}$=10,000 samples/per). The time required for the known capacitor to charge from 10%-90% of the drive voltage will give the rise time, or time constant for the system between the particular compensation electrode 45 and the common electrode 39. From this value, the capacitance at the measured compensation electrode 45 can be calculated. The MCU 165 will take this capacitance value, compare it to a known calibrated capacitance value and make adjustments to the drive voltage for that particular electrode supplied via the corresponding driver 171, based on a compensation algorithm. The sensing may run continuously, unless the compensation is disabled.

Depending on the sensing circuit used, the compensation driver 171 should be initially calibrated with appropriate calibration tables, curves or algorithms implemented by the device logic (e.g. by the MCU 165) so as to allow for proper operation of the device. In the aforementioned case, voltage, current, capacitance or time constant values could be a basis of calibration using built in look-up tables or some calculated calibration curve as a reference.

In the case of a look-up table, the calibration value for each electrode 45 that corresponds to the expected capacitance or time constant at each electrode 45 would be stored in non-volatile memory. The memory may be within the compensation driver circuitry or in the MCU 165. For a look-up table approach, there would be a reference value for each compensation electrode 45 that would correspond to the desired/expected shape. Depending on the applied sidewall voltages, these expected values would change to new expected values. Hence, there would be reference tables for each compensation electrode 45 for however many different shapes are expected. This approach may be limited in full range capability and compensation accuracy depending on available memory built into the compensation driver circuitry or in the MCU 165. At the high level, during monitoring, if there is a detected difference from the known calibration value for any one compensation electrode 45, the compensation driver 171 for that electrode will make adjustments to the supply voltage amplitude or the waveform duty cycle until the value sensed/calculated for the respective compensation electrode matches the applicable value within the look-up table.

Similar to a look-up table, a curve will be some mathematical equation that fits a specific curve that will correspond to a desired fluid interface shape. The curve or curves would be dependent on the electrode layout and expected measurement values (e.g. capacitance, voltage, time constant). A curve, or just one equation that represents the three-dimensional (3D) shape of the expected curve, would be generated and stored for each compensation electrode 45. For a single curve per electrode, the curve for each electrode would not change, but the reference value would change depending on the sidewall voltages. Each electrode would have some equation associated to it which is used to determine a reference value. The 3D curve method would be more complicated and would be dependent on electrode location as well as the sidewall voltages. In either curve case, each electrode would be measured and then referenced to the calculated calibration curve value to determine any deviation. If there is a deviation from the calculated curve value, an adjustment will be made by the compensation driver to correct the deviation.

An algorithmic method would generally make use of either a look-up table or a curve or both, depending on its implementation. This method may be implemented to allow for more accurate compensation by allowing the driver or higher level logic to choose which compensation values to reference depending on expected accuracies, to more dynamically determine the adjustments, and to allow for faster compensation by dynamically omitting electrodes to sense on a given cycle.

Returning to the overall system example of FIG. 11, the controller 160 also includes a processor, one or more digital storage media, data and programming in the storage and appropriate input/output circuitry. Although other processor based architectures may be used (e.g. architectures built around one or more microprocessors), the example of controller 160 utilizes a Micro-Control Unit (MCU) 165, which implements the control logic for the controller 160 and thus of the system 145. For example, the MCU 165 implements the logic for control of operations of the associated optical/electrical apparatus 150. Although shown as controlling only one such apparatus 150, the MCU and controller may control a number of such apparatuses 150.

The MCU 165 may be a microchip device that incorporates a processor 166 serving as the programmable central processing unit (CPU) of the MCU 165 as well as one or more memories, represented by memory 167 in the drawing. The memory 167 is accessible to the processor 166, and the memory or memories 167 store executable programming for the CPU formed by processor 166 as well as data for processing by or resulting from processing of the processor 166. For example, the memory 167 may store a set of calibrated compensation look-up tables specifying a compensation voltage based on a difference between an expected capacitance for an intended meniscus shape (as if no distortion) and a capacitance determined from the sensing of the fluid condition (when meniscus may be subject to distortion). The MCU 165 may be thought of as a small computer or computer like device formed on a single chip. Such devices are often used as the configurable control elements embedded in special purpose devices rather than in a computer or other general purpose device. A variety of available MCU chips, for example, may be used as the MCU 165 in the controller 160 of system 145.

The MCU 165 in this example also includes various input and output (I/O) interfaces, shown collectively by way of example as interface 168 in FIG. 11. The I/O interfaces 168, for example, support control outputs to the EW cell driver system 163. In the example of FIGS. 11-13, where the EW cell driver system 163 also provides feedback, The I/O interfaces 168 also receive feedback input(s) from the cell driver system 163. For a system 145 with a transducer 151, the I/O interfaces 168 also support a control output and/or input to the driver or sense control circuitry 161 for the particular type of optical/electrical transducer 151. The I/O interfaces 168 also support input/output communications with one or more electronic devices, which may be connected to or incorporated in the system 145 (e.g. to provide a user interface not shown) or which may be remote.

In the illustrated example, the controller 160 also includes a communication transceiver (XCVR) 169 coupled to the processor 166 (and possibly to the memory 167) via an I/O output interface 168 of the MCU 165. Although shown separately, the transceiver 169 may be implemented in circuitry on the same chip as the elements of the MCU 165. Although the drawing shows only one transceiver 169, controller 160 may include any number of transceivers, for example, to support additional communication protocols and/or provide communication over different communication media or channels.

The transceiver 169 supports communication with other control or processing equipment, for example, with a remote user interface device, a remote host or user computer, and/or with a server or gateway of a building control and automation system (BCAS) or the like. The transceiver 169 may also support system communication with a variety of other equipment of other parties having access to the system 145 in an overall/networked system encompassing a number of similar systems 145, e.g. for access to each system 145 by equipment of a manufacturer for maintenance or access to an on-line server for downloading of programming instructions or configuration data for setting aspects of sensing or lighting operation of the associated optical/electrical transducer(s) 151, updated tables for the distortion compensation, or the like. The circuitry of the transceiver 169 may support such communication(s) over any available medium, such as wire(s), cable, optical fiber, free-space optical link or radio frequency (RF) link.

The example system 145 of FIG. 11 includes a single transducer and an associated single electrowetting cell 100. For some applications, a similar system may combine a number of cells 100 to form an electrowetting cell array 109 for use with one or more optical/electrical transducers.

The example in FIG. 11 utilizes a MCU 165, which incorporates, for example, the processor and a memory. As noted, the controller 160 may use a microprocessor instead of the MCU. A microprocessor based approach typically includes external memory or other data storage device(s) as well as a variety of other system components coupled for local data communication (e.g. via a bus) with the microprocessor. A microprocessor based configuration for the controller 160 may be similar to that of any of a variety of types of other smart electronic devices, such as an architecture for a personal computer or an architecture for a mobile terminal device. The MCU and microprocessor-based approaches are given only by way of non-limiting examples.

As used herein, a processor is a hardware circuit having elements structured and arranged to perform one or more processing functions, typically various data processing functions. Although discrete logic components could be used, the examples utilize components forming a programmable central processing unit (CPU). A processor for example includes or is part of one or more integrated circuit (IC) chips incorporating the electronic elements to perform the functions of the CPU.

The applicable processor executes programming or instructions to configure the system 145 to perform various operations. For example, such operations may include various general operations (e.g., a clock function, recording and logging operational status and/or failure information) as well as various system-specific operations (e.g. controlling beam shaping of input or output light, operation of the transducer(s) and the like) of an optical/electrical apparatus 150 incorporating one or more of the variable liquid crystal optics and associated transducer(s). The programming or instructions also configure the system 145 to perform operations to apply voltage(s) to the compensation electrode(s) 45 to mitigate against distortion by compensating for external-force and/or orientation of the electrowetting cell 100. Although a processor may be configured by use of hard-wired logic, typical processors in lighting devices or in light responsive devices are general processing circuits configured by execution of programming, e.g. by instructions and any associated setting data from the memories shown or from other included storage media and/or received from remote storage media.

Figure 14:
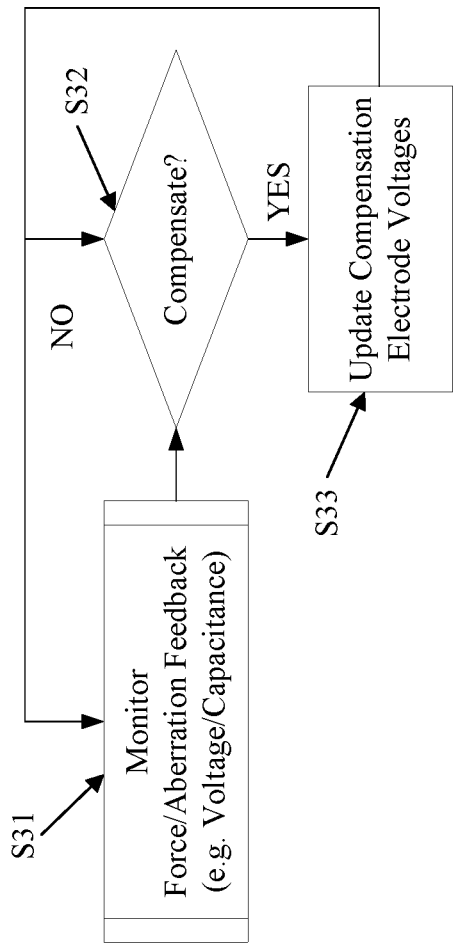
FIG. 14 is a general high-level flow chart of an example of monitoring a state of the fluid(s) of an electrowetting cell and controlling the cell based on the monitored state to mitigate aberration or distortion, as an example of compensation for an external force on the fluid(s).

An example process flow is discussed with respect to FIG. 14, which may be implemented in the system 145 of FIG. 11, as may be controlled by programming of the system processor (e.g. the processor 166 of the MCU 165). FIG. 14 is a general high-level example of a process involving monitoring a state of the fluid(s) of an electrowetting cell 10 or 100 and controlling the cell based on the monitored state to mitigate aberration or distortion, as an example of compensation for an external force on the fluid(s). The monitoring and compensation procedure may compensate for distortions due to a variety of forces, such as gravity, vibration, motion, or the like. More detailed examples are discussed later with regard to FIGS. 14A and 14B.

The steps S31 to S33 are performed with respect to each compensation electrode of the particular cell structure. The high-level example of FIG. 14 involves a step of monitoring (step S31) a form of cell condition feedback that relates to the applied force and/or an aberration of the fluidic interface due to the force. A measured value from feedback sensing, such as charge or voltage or a parameter determined from a measured/sensed value such as capacitance, is compared (in step S32) to a reference value related to the condition as expected to exist (e.g. if the Expected interface shape were achieved in absence of the force and resulting aberration or distortion—see FIGS. 5 and 6). In comparison step S32, processing returns to S31 for continued monitoring if the comparison indicates that no further compensation (e.g. no adjustment of compensation voltage) is needed for the particular electrode 45. If the comparison step S32 indicates a need to adjust the compensation voltage of the electrode (e.g. if there is a deviation from the applicable reference value larger than a threshold magnitude), then processing branches to step S33, in which step S33 the MCU 165 instructs the appropriate compensation driver 171 to apply compensation voltage (or adjust compensation voltage applied) to the particular external-force compensation electrode 45 in an amount based on the deviation between value from the monitoring and the applicable reference value.

Through iterations of steps S31 to S33, if the monitoring and comparison detects a difference from the reference value for any one compensation electrode 45, the compensation driver 171 for that electrode 45 is controlled to make adjustments to the supply voltage amplitude or the waveform duty cycle until the value sensed/calculated for the respective compensation electrode 45 matches the reference value.

The detection used in the monitoring step may involve sensing of an internal condition related to the fluid state, such as charge or voltage and/or associated determination of capacitance. In such examples, external sensors may be unnecessary. In other examples, however, an external sensor such as an orientation detector, may provide an additional input to the compensation process, for example, for use in combination with the internal condition detection. Reference data values may be provided by look-up tables or suitable curves or algorithms. Compensation values and/or adjustments thereof may be determined as a function of (e.g. proportional to) the deviation, incremental by a fixed amount but having a polarity determined by the polarity of the deviation, obtained from a lookup table based on the determined deviation, or determined by a variety of other techniques.

Figure 14A:
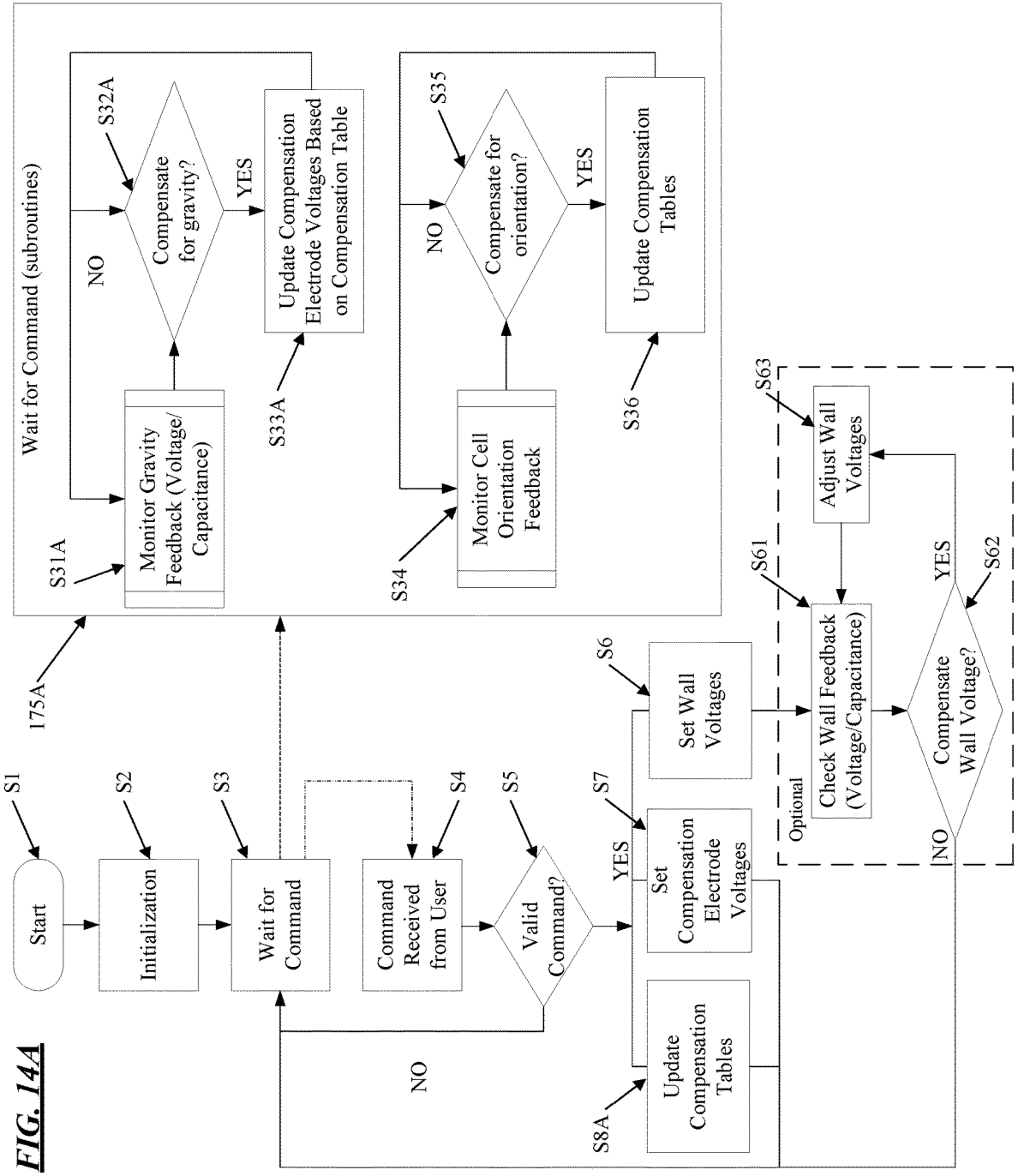
FIG. 14A is a flow chart of a first example of a more detailed method of controlling the electrowetting cell, including steps for compensating for an external force such as gravity and/or cell orientation.

FIG. 14A is a flow chart of a first example of a more detailed methodology for controlling the electrowetting cell 10 or 100, which includes examples of steps for compensating for an external force such as gravity and/or cell orientation. For this example, it is assumed that the force that may cause aberration or distortion of the fluid interface is gravity. Also, the example combines orientation detection with internal sensing.

With reference to FIG. 14A as well as FIGS. 1 and 11-13, the system operation starts at step S1, for example, at power up; and the processor 166 initializes itself and other elements of the system 145 in step S2 as may be appropriate.

A method of operating an electrowetting cell 10 or 100, for example, may entail applying a control voltage to each of one or more control channel electrodes 35 of the electrowetting cell located about an optical axis of the electrowetting cell to establish an optical state of a meniscus between two different fluids 19, 21 in the electrowetting cell, one fluid being relatively conductive and the other being relatively non-conductive. For this and several other purposes discussed more later, the MCU 165 will detect and respond to commands, from a user or remote controller. Hence, the MCU will wait for a command in step S3, and processing flows to step S4 when the system 145 receives a new command. While waiting for a command at S3, the system also implements one or more subroutines, examples of which are shown collectively at 175A. The subroutines 175A are described in more detail later with regard to steps S31A to S36.

When a command is received in step S4, processing proceeds to step S5 in which the MCU 165 checks the validity of the command. If invalid, processing returns to step S3 in which the system waits for a new command. However, if the received command is valid, processing branches to the appropriate one of steps S6 to S8A based on the type of received command.

The system 145 with the electrowetting cell 100 or 10 may receive a variety of commands, and steps S6 to S8A represent just three examples. The commands may be based on direct data input by a user. Although not shown, a user terminal device in communication with the controller 160 may select a high level option that causes the user device to send the relevant command to the controller. For example, a command to set voltages (control channel/wall voltages or compensation voltages) may be based on a user selection of a desired optical performance (lens of a desired focal length and/or having a desired beam steering angle) and/or orientation relative to gravity from a graphical user interface offered via the user's terminal device. As another example, the commands may be automatically generated from some other remote controller (e.g. generated based on time or other conditions monitored at the remote controller). Another example command represented in the FIG. 6 flow chart is a command to update data table(s) used in a subroutine for compensation for gravity. The system 145 of course may be configured to receive and respond to other direct commands in addition or instead of one or more of the example commands shown in FIG. 6.

At step S6, the command relates to setting the control channel voltages for the electrodes 35 on the lateral wall(s) of the cell to achieve an intended meniscus shape, e.g. for a set lens or prism type optical processing by the cell. Optionally, the cell may provide feedback with respect to the wall control channel voltages, e.g. by measuring impedance and/or charge time at each control channel electrode 35 on a lateral wall of the cell to enable computation of capacitance at each control channel electrode. Such sensing, for example, may be performed at the control channel electrodes by circuitry similar to that of the sense circuits 173 associated with the compensation drivers 171 discussed earlier.

The computed capacitance can be compared to a reference value that corresponds to a capacitance expected if/when the meniscus shape in the vicinity of the control channel electrode achieves the shape intended to result from the set wall electrode voltages. In the process flow example, the MCU 165 checks the feedback in step S61; and determines (step S62) if the feedback indicates that the control channel voltages need adjustment. If so, the MCU 165 instructs appropriate ones of the control channel driver circuits 156 to adjust the voltages applied to the control channel electrodes 35, to compensate for any variation of the meniscus shape from the intended shape. Hence, if compensation is needed, processing branches from step S62 to step S63 where the MCU adjusts one or more of the control channel voltages for the electrodes 35 on the lateral wall(s) of the cell to compensate for the difference between the computed capacitance and the capacitance expected when the cell achieves the intended meniscus shape. The steps S61 to S63 form a loop and repeat until the measurement indicates capacitance within a predetermined tolerance of that expected when the cell achieves the intended meniscus shape, at which point the decision at step S62 indicates no compensation is needed on the control channel voltages for the electrodes 35 on the lateral wall(s) of the cell. Although shown as a single loop, for convenience, steps S61 to S63 are configured or duplicated to consider and independently adjust as appropriate the control voltage applied to each individual one of the control channel electrodes 35. When compensation is not necessary at step S62, the processing branches from step S62 back to step S3 in which the MCU is waiting for a new command input.

Returning to step S5, another type of valid command that may be received is a command to directly set compensation electrode voltages, in which case the process flow branches from step S5 to step S7. This command allows a user to directly instruct the MCU as to a set of voltages to apply to the external-force compensation electrodes. The command, for example, may allow a user to set the voltage(s) at any one or more of the individually addressable external-force compensation electrodes 45.

Returning to step S5, another type of valid command that may be received is a command to update compensation tables, in in which case the process flow branches from step S5 to step S8A. The command received in step S8A may instruct the MCU to select a specific table for use in the force responsive compensation subroutine (shown as gravity compensation steps S31A to S33A by way of example in FIG. 14A). The table selection may be an initial selection intended for use with a new setting for the wall voltages received in a command in step S6, although the wait-for-command subroutines 175A may include a subroutine (shown as steps S34 to S36) to subsequently change the compensation look-up table based on later detected orientation. Another use of the update compensation tables command might allow a user to select a specific table for use in the compensation subroutine or to instruct the MCU to receive and install a download of one or more updated tables.

Some of the direct command capabilities, combined with the force monitoring and/or orientation monitoring as part of the wait-for-command subroutines 175A may be used in a training and/or learning mode, to refine the calibration of the data in the compensation table(s).

Returning to step S3, while waiting for a command, the system 145 implements a number of subroutines 175A relating to compensation for external force applied to the fluids 19, 21 and/or to the orientation of the cell (e.g. relative to the aberration inducing force such as gravity). An electric condition of one or more of the fluids of the electrowetting cell is sensed. Orientation also be detected in the illustrated example. The method example also involves applying a compensation voltage to an external-force compensation electrode, which is located adjacent to the relatively non-conductive one of the fluids and perpendicular to the optical axis of the electrowetting cell. The applied compensation voltage is based on the sensed electric condition and serves to compensate for a distortion of the actual state of the meniscus between the two fluids 19, 21 of the electrowetting cell due to an external force (e.g. gravity) on the fluids. These operations are performed in the example of FIG. 14A while the MCU 165 is waiting to receive a new command in step S3. For purposes of a specific example, the compensation is responsive both to feedback such as a voltage/capacitance measurement to indicate actual condition of the fluids of the cell and monitored orientation of the electrowetting cell. Hence, during the step S3, while waiting for a command, the system implements subroutines in steps S31A to S36, which may include two separate processing loops.

Figure 14B:
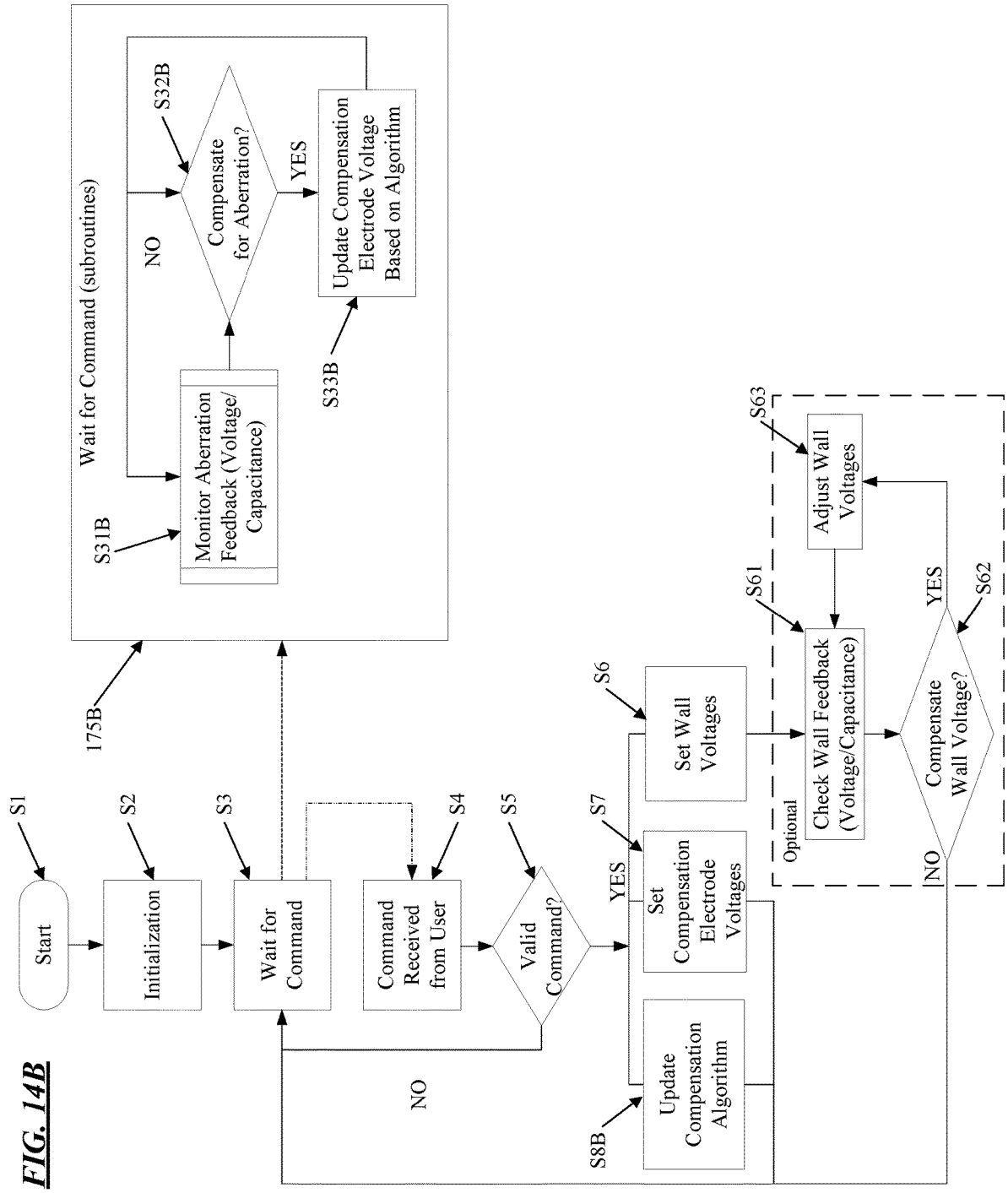
FIG. 14B is a flow chart of a another example of a more detailed method of controlling the electrowetting cell.

As noted, processes like those of FIGS. 14 to 14B may be used to compensate for various types of forces on the cell, such as gravity, vibration or motion that may cause a meniscus distortion or aberration. By way of a specific example, however, FIG. 14A depicts for compensation in which the external force that may cause a meniscus distortion or aberration is gravity. Hence, in step S31A the MCU monitors the feedback related to the impact of the force of gravity, in this example. Assuming an implementation of the driver system like 157 as in FIG. 13, the MCU 165 monitors signals from the sense circuits 173, processes those signals to determine capacitances values at the various external-force compensation electrodes 45. This example uses a lookup table approach to supplying the reference values for comparison to the results of the monitoring. Hence, for a given state/shape of the meniscus (corresponding to a set of control channel electrode voltages), the memory will store a set of reference values for expected capacitance at each of the external-force compensation electrodes 45. The values in the lookup table may be based on a calibration procedure or derived from calculations of theoretical optimal values.

In step S32A, the MCU 165 compares the determined capacitance values to expected reference capacitance values at the electrodes for a meniscus shape corresponding to the current control channel electrode voltages (e.g. capacitance values when there was no distortion due to the force of gravity). For each electrode 45, at step S32A, the MCU 165 determines if compensation (or adjustment of compensation) is needed based on the results of the comparison to the reference capacitance value for the particular electrode. The determination in step S32A, for example, may involve comparing each detected deviation between computed and reference values to a deviation threshold. If a deviation at a particular electrode 45 is less than (or less than or equal to) the threshold, compensation is not needed at that particular electrode. When compensation is not needed, processing branches back to monitoring step S31A.

In our example, the MCU 165 determines compensation is needed at a particular electrode 45 when any deviation between computed and reference values for that electrode is greater than (or greater than or equal to) the threshold. If the MCU 165 determines at S32A that compensation (or adjustment of compensation) is needed for a particular electrode, processing branches to step S33A, in which the MCU 165 instructs the appropriate compensation driver 171 to apply compensation voltage to the particular external-force compensation electrode 45. Although shown as a single loop S31A to S33A, the steps are performed individually for all of the electrodes 45, to monitor feedback, determine if compensation or adjustment of compensation is needed and to instruct appropriate one(s) of the electrode drivers to apply selected compensation voltages.

For a particular intended state/shape of the meniscus (corresponding to a set of control channel electrode voltages) there may be one or more look-up tables specifying the compensation voltages. Either in separate tables or in multiple dimensions of an integrated table, the table(s) would specify a compensation voltage for each external-force compensation electrode 45 based on a determined deviation of the computed capacitance from the reference value for the capacitance at the respective compensation electrode, for use in step S33A of the compensation subroutine. The reference values for capacitance at the various electrodes 45 may be included in the same or a separate table stored in the memory.

Optionally, if the system includes an orientation sensor 158, the MCU 165 may use orientation to select appropriate table(s) for use in steps S32A, S33A of the compensation subroutine. Hence, in the example of FIG. 14A, in step S34 the MCU 165 monitors the orientation feedback indicated by sensor 158. Upon sensing a need to adjust compensation based on orientation, e.g. if there has been a significant change, the subroutine process flows from step S35 to step S36; if not, then the subroutine process flows from step S35 back to monitor the cell orientation in step S34. In step S36, based on a detected orientation, the MCU selects a different compensation table for use in in steps S32A, S33A of the gravity compensation subroutine in FIG. 14A.

The example of FIG. 14A utilized calibrated orientation reference values for the comparison step, and those values are provided by a look-up table. Calibration to determine those values may be obtained from operation of a test cell, determination of performance (e.g. without compensation), and determination of compensation values that achieve desired performance (suitably mitigate distortion(s)) under various applied force conditions. Alternatively, individual cells may be so calibrated before sale/installation. Other strategies may be used, however, to determine the appropriate reference values. Alternative examples may utilize a curve or algorithm, and the curve or algorithm may be calibrated or may be determined by theoretical calculation of a suitably optimized performance. Calibration for such alternative examples might involve monitoring the compensation electrodes as normal, but would also measure them against the orientation values of preset expected orientations. These values would be a curve or algorithm settings results of which could be referenced and then used to update the expected compensation values, as needed.

FIG. 14B is another detailed process example. A number of the steps in the example of FIG. 14B are the same as in FIG. 14A and are identified by the same reference numerals. Steps indicated by the same reference numbers in both flow charts should be well understood from the description thereof above relative to FIG. 14A and are not further described relative to FIG. 14B.

The example of FIG. 14B monitors aberration, which may be caused by vibration or motion or another force on the cell 10 or 100 but need not specifically be gravity. Also, rather that utilizing lookup tables, the example of FIG. 14B utilizes a compensation algorithm. While waiting for a command at S3, the system implements one or more subroutines, examples of which are shown collectively at 175B. The subroutine 175B includes example steps S31B to S33B, which in this case do not utilize orientation detection.

At the high level, during monitoring, if there is a detected difference from the known calibration value for any one compensation electrode 45, the compensation driver 171 for that electrode will make adjustments to the supply voltage amplitude or the waveform duty cycle based on a compensation algorithm until the value sensed/calculated for the respective compensation electrode matches the known reference values.

In this example, where the cell experiences an external force that may cause a meniscus distortion or aberration, in step S31B the MCU 165 monitors the feedback related to the impact of the force on the fluidic system. Assuming an implementation of the driver system like 157 as in FIG. 13, the MCU 165 monitors signals from the sense circuits 173, processes those signals to determine capacitances values at the various external-force compensation electrodes 45.

For a given Expected state/shape of the meniscus (corresponding to a set of control channel electrode voltages), the MCU 165 in step S32B MCU 165 compares the determined capacitance values to expected reference capacitance values at the electrodes for the Expected meniscus (e.g. capacitance values when there was no distortion due to the force of gravity, vibration or motion). For each electrode 45, at step S32B, the MCU 165 determines if compensation (or adjustment of compensation) is needed based on the results of the comparison to the reference capacitance value for the particular electrode. The determination in step S32, for example, may involve comparing each detected deviation between computed and reference values to a deviation threshold. If a deviation at a particular electrode 45 is less than (or less than or equal to) the threshold, compensation is not needed at that particular electrode. When compensation is not needed, processing branches back to monitoring step S31. When compensation for aberration is needed, as indicated by the comparison in step S32B, processing branches to step S33B.

In step S33, the MCU 165 instructs the appropriate compensation driver 171 to apply compensation voltage to the particular external-force compensation electrode 45. In the example of FIG. 14B, the MCU 165 updates the compensation voltage for an electrode 45 based on a suitable algorithm. The algorithm utilized in the update step S33B may be implemented in the form of data derived from a mathematical equation that corresponds to a desired fluid interface shape.

An algorithmic method may allow for more accurate compensation by allowing the driver or higher level logic to choose which compensation values to reference depending on expected accuracies, to more dynamically determine the adjustments, and to allow for faster compensation by dynamically omitting electrodes to sense on a given cycle thereby reducing sensing and adjustment times. An electrode sense omission process on a given cycle could be based on the lack of any detected deviation from the calibrated values amongst certain areas of the compensation electrode array for a selected number of compensation cycles. For example, if there are only small deviations in the center electrodes over ten compensation cycles, then the algorithm may decide to omit measurement of the outermost electrodes. This would allow for faster compensation of the centermost electrodes where there are deviations.

The other change from FIG. 14A relates to an alternate update step S8B. In that step the valid received command may instruct the MCU to select a specific algorithm (or specific table or other set of algorithmically derived data) for use in the force responsive compensation subroutine of steps S31B to S33B. The algorithm selection may be an initial selection intended for use with a new setting for the wall voltages received in a command in step S6. Another use of the update compensation algorithm command might allow a user to select a specific algorithm for use in the compensation subroutine or to instruct the MCU to receive and install a download of one or more updated algorithms.

The examples of FIGS. 11 to 14B assumed an implementation in which a higher level processor, e.g. in an MCU or the like, is electrically separate from and controls a number of control channel and compensation drivers. Other implementations of the circuitry may be used, for example, with a processor or logic circuit in each of the various drivers implementing individual portions the processing/control functions outlined above. Another arrangement might have a processor for the control channels and a processor for the compensation drivers (as a group); and in this later case, there may be a higher level control element (e.g. microprocessor or MCU) that provides higher level control and controls communications to outside equipment.

Also, the process flows of FIGS. 14, 14A and 14B are given by way of non-limiting examples. For example, the illustrated steps in any of those processes may be arranged in different order(s). Also, the control to achieve an intended meniscus shape in combination with the force compensation may involve other steps instead of some or all of those specifically shown in the example process flows.

As outlined above, a class of applications of an electrowetting cell as in the examples of FIGS. 1 to 10 with suitable light source type transducers as in FIG. 11 provide configurable luminaires. The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below. The technologies discussed above, however, are also readily adaptable to other types of light generation and distribution applications, such as vehicle lighting.

Terms such as "artificial lighting," as used herein, are intended to encompass essentially any type of lighting that a device produces light by processing of electrical power to generate the light. An artificial lighting device, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type. The illumination light output of an artificial illumination type luminaire, for example, may have an intensity and/or other characteristic(s) that satisfy an industry acceptable performance standard for a general lighting application.

Artificial light output from a luminaire may carry information, such as a code (e.g. to identify the luminaire or its location) or downstream transmission of communication signaling and/or user data. The light based data transmission may involve modulation or otherwise adjusting parameters (e.g. intensity, color characteristic or optical spatial distribution (e.g. beam steering and/or shaping)) of the illumination light output from the device.

Another class of applications for the electrowetting cell relate to sensing applications. A sensing application typically combines a detector type transducer with one or more electrowetting. The detector, for example, may be a single light responsive component, a combination of several light responsive components detecting the same or different light characteristics, or a pixel array of light detectors (e.g. for image sensing). Although some photovoltaic devices may output power in response to optical energy, sensors typically involve some processing circuitry to operate the particular type of detector.

Displays and a variety of other applications of the electrowetting cell also are within the scope of the disclosure above.

In the example of FIGS. 1-6, both plates 15, 17 and the associated end walls 41, 43 are transparent. As a result, the cell 10 allows passage of light through the fluids within the cell, for example along and about the axis A-A. Light passing through such a cell 100 may be refracted as a result of passage through the fluids 19, 21 in an amount dependent of the shape of the meniscus between the fluids, which is electrically controllable. Passage and such refraction of light through the cell may apply to light entering the cell in either direction, e.g. through either of the plates 15, 17 and associated end walls 41, 43. In such a cell, refracted light similarly may emerge from the cell in either direction, e.g. through either of the plates 15, 17 and associated end walls 41, 43.

The examples shown and described above thus have concentrated mainly on light transmissive electrowetting cells, that is to say a cell that acts as a lens and/or prism and is relatively transparent with respect to light that passes entirely through the optically active area of the cell. Teachings herein, including the compensation technologies under discussion here, may also relate to reflective electrowetting cells.

For example, a reflector may be provided at one of the end walls 41, 43 or even at the meniscus of the fluids 19, 21. Alternatively, one of the liquids could be reflective, in which case that liquid itself could be used as reflector without adding any extra reflector. In a reflective electrowetting cell, electrical control of the shape of the meniscus could be implemented via voltages applied to the control channel electrodes 35 in a manner similar that described above for the transmissive cell examples. The reflective electrowetting cell would include external-force compensation electrode(s) 45 as in the example of FIGS. 1-6; and sensing of a condition indicative of distortion or a force/orientation causing distortion also may be implemented in a manner similar to that used in the transmissive cell examples, to control the compensation voltage(s) applied to the external-force compensation electrode(s) 45 of the reflective electrowetting cell. The compensation system would operate the same and have the same benefit as has been detailed with a transmissive EW system.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An electrowetting cell, comprising:
   a fluid sealed capsule having an optical axis, the capsule including:

a lateral enclosure surrounding the optical axis with one or more lateral walls;

at least one control channel electrode at the one or more lateral walls;

a first transparent wall coupled to the first axial end of the lateral enclosure to seal the first axial end of the lateral enclosure;

a common electrode;

a second transparent wall coupled to the second axial end of the lateral enclosure, opposite the first transparent wall, to seal the second axial end of the lateral enclosure; and a plurality of external-force compensation electrodes at the second transparent wall, at locations distributed across an area of the second transparent wall across the optical axis, wherein the external-force compensation electrodes are configured to each independently receive a force compensation voltage; and a first fluid inside the capsule at the sealed second axial end of the lateral enclosure in proximity to the second transparent wall, the first fluid being relatively non-conductive; and a second fluid filling a remainder of the capsule to the first transparent wall, the second fluid being relatively conductive and in contact with the common electrode, the first and second fluids being immiscible with respect to each other.

2. The electrowetting cell of claim 1, further comprising:
a dielectric covering the at least one control channel electrode at the one or more lateral walls and the external-force compensation electrodes at the second transparent wall, wherein at least a portion of the dielectric covering the external-force compensation electrodes is transparent.

3. The electrowetting cell of claim 1, wherein a transparent member has a well formed therein including the one or more lateral walls the lateral enclosure and one of the first and second transparent walls.

4. The electrowetting cell of claim 1, wherein:
a relatively non-transparent member has a well formed therein including the one or more lateral walls the lateral enclosure; and the first and second transparent walls are on respective first and second transparent members sealably coupled to relatively non-transparent member to seal opposite ends of the well.

5. A controllable optical apparatus comprising the electrowetting cell of claim 1 and a driver system, the driver system including:
at least one control channel driver coupled to the at least one control channel electrode to apply a control voltage to each control channel electrode; and at least one compensation driver, coupled to the external-force compensation electrodes, to apply a compensation voltage to each external-force compensation electrode.

6. The controllable optical apparatus of claim 5, further comprising:
a cell condition detection circuit coupled to the common electrode and to another of the electrodes of electrowetting cell, configured to sense an electric condition of one or more of the fluids; and a processor coupled to respond to the electric condition sensed by the detection circuit to control the at least one compensation driver to set the compensation voltage applied to at least one of the external-force compensation electrodes based on the sensed electric condition.

7. The controllable optical apparatus of claim 6, further comprising:
an orientation detector, coupled to the electrowetting cell, configured to generate an indication of orientation of the electrowetting cell, wherein the processor also is coupled to respond to the indication of the orientation of the electrowetting cell to also control the at least one compensation driver so that the setting of compensation voltage applied to the at least one of the external-force compensation electrodes also is based on the indication of orientation.

8. The controllable optical apparatus of claim 5, further comprising:
an orientation detector, coupled to the electrowetting cell, configured to generate an indication of orientation of the electrowetting cell; and a processor coupled to respond to the indication of the orientation of the electrowetting cell to control the at least one compensation driver to set the control voltage applied to at least one external-force compensation electrodes based on the indication of orientation.

9. An apparatus comprising the electrowetting cell of claim 1 and an optical/electrical transducer optically coupled to the electrowetting cell to send or receive light along the optical axis and through the first and second fluids.

10. A system comprising the apparatus of claim 9 and a processor coupled to the electrowetting cell and the optical/electrical transducer.

11. A system comprising:
an electrowetting cell, including:
a substrate having a lateral enclosure surrounding an optical axis with one or more lateral walls;

at least one control channel electrode at the one or more lateral walls;

a first transparent plate coupled to the substrate at the first axial end of the lateral enclosure to seal the first axial end of the lateral enclosure;

a common electrode;

a second transparent plate coupled to the substrate at the second axial end of the lateral enclosure, opposite the first transparent plate, to seal the second axial end of the lateral enclosure; and a plurality of external-force compensation electrodes formed in or on a surface of the second transparent plate at locations distributed across an area of the second transparent plate across the optical axis, wherein the external-force compensation electrodes are configured to each independently receive a force compensation voltage;

a first fluid inside a electrowetting cell at the sealed second axial end of the lateral enclosure in proximity to the external-force compensation electrode, the first fluid being relatively non-conductive; and a second fluid filling a remainder of the electrowetting cell to an interior wall of the first transparent plate, the second fluid being relatively conductive and in contact with the common electrode, the first and second fluids being immiscible with respect to each other;

at least one control channel driver coupled to the at least one control channel electrode to apply a control voltage to each control channel electrode;

at least one compensation driver coupled to the external-force compensation electrodes to apply a compensation voltage to each external-force compensation electrode; and a processor coupled to the drivers, to control:
(a) the at least one control channel driver to apply voltage to each control channel electrode to establish a selected optical state of the fluids in the electrowetting cell; and
(b) to set the compensation voltage applied to each external-force compensation electrode, to compensate for a distortion of the actual state of the fluids in the electrowetting cell due to an external force on the fluids.

12. The system of claim 11, further comprising:
a cell condition detection circuit coupled to the common electrode and to another of the electrodes of electrowetting cell, configured to sense an electric condition of one or more of the fluids, wherein:
the processor is coupled to respond to the cell condition detection circuit; and
the setting of the voltage applied to each external-force compensation electrode is based on the sensed electric condition.

13. The system of claim 12, further comprising:
an orientation detector, coupled to the electrowetting cell, configured to generate an indication of orientation of the electrowetting cell, wherein:
the processor also is coupled to respond to the orientation detector; and
the setting of the voltage applied to each external-force compensation electrode is further based on to the indication of the orientation of the electrowetting cell.

14. The system of claim 11, further comprising:
an orientation detector, coupled to the electrowetting cell, configured to generate an indication of orientation of the electrowetting cell, wherein:
the processor is coupled to respond to the orientation detector; and
the setting of the voltage applied to each external-force compensation electrode is based on the indication of the orientation of the electrowetting cell.

* * * * *